(12) United States Patent
Irukulapati et al.

(10) Patent No.: US 11,895,646 B2
(45) Date of Patent: Feb. 6, 2024

(54) SSB TO RO MAPPING AGAINST REMOTE INTERFERENCE

(71) Applicant: Telefonaktiebolaget LM Ericsson (publ), Stockholm (SE)

(72) Inventors: Naga Vishnu Kanth Irukulapati, Västra Frölunda (SE); Sebastian Faxér, Stockholm (SE); Henrik Sahlin, Mölnlycke (SE); Jingya Li, Gothenburg (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 19 days.

(21) Appl. No.: 17/280,169

(22) PCT Filed: Aug. 28, 2019

(86) PCT No.: PCT/SE2019/050807
§ 371 (c)(1),
(2) Date: Mar. 25, 2021

(87) PCT Pub. No.: WO2020/067950
PCT Pub. Date: Apr. 2, 2020

(65) Prior Publication Data
US 2021/0352697 A1    Nov. 11, 2021

Related U.S. Application Data

(60) Provisional application No. 62/736,803, filed on Sep. 26, 2018, provisional application No. 62/736,810, filed on Sep. 26, 2018.

(51) Int. Cl.
*H04W 72/1273*    (2023.01)
*H04B 17/345*    (2015.01)
(Continued)

(52) U.S. Cl.
CPC ...... *H04W 72/1273* (2013.01); *H04B 17/345* (2015.01); *H04W 16/28* (2013.01); *H04W 56/00* (2013.01); *H04W 74/08* (2013.01)

(58) Field of Classification Search
CPC ......... H04W 72/1273; H04W 72/1268; H04W 72/1263; H04W 74/00; H04W 74/08;
(Continued)

(56) References Cited

U.S. PATENT DOCUMENTS

| | | | |
|---|---|---|---|
| 2018/0176065 A1* | 6/2018 | Deng | H04L 27/2673 |
| 2019/0246301 A1* | 8/2019 | Gheorghiu | H04B 17/318 |

(Continued)

FOREIGN PATENT DOCUMENTS

JP    2019140436 A    *    8/2019

OTHER PUBLICATIONS

Author Unknown, "Technical Specification Group Radio Access Network; Evolved Universal Terrestrial Radio Access (E-UTRA); Physical channels and modulation (Release 15)," Technical Specification 36.211, Version 15.2.0, 3GPP Organizational Partners, Jun. 2018, 236 pages.

(Continued)

*Primary Examiner* — Phong La
(74) *Attorney, Agent, or Firm* — Withrow & Terranova, PLLC

(57) ABSTRACT

Systems and methods are disclosed herein for mapping Synchronization Signal Blocks (SSBs) to transmit beam directions taking into account remote interference. In this regard, embodiments of a method performed by a base station in a cellular communications network are disclosed. In some embodiments, a method performed by a base station in a cellular communications network comprises determining a beam direction to SSB index mapping, taking into consideration remote interference. The method further com- (Continued)

prises using the beam direction to SSB index mapping. Because the SSBs have corresponding Physical Random Access Channel (PRACH) occasions, determining the beam direction to SSB index mapping taking into account remote interference improves PRACH preamble robustness.

17 Claims, 25 Drawing Sheets

(51) Int. Cl.
*H04W 16/28* (2009.01)
*H04W 56/00* (2009.01)
*H04W 74/08* (2009.01)

(58) Field of Classification Search
CPC ..... H04W 74/04; H04W 16/28; H04W 16/26; H04W 56/00; H04W 56/0005; H04W 56/0025; H04W 56/0035; H04B 17/345; H04B 17/336
See application file for complete search history.

(56) References Cited

U.S. PATENT DOCUMENTS

| | | | | |
|---|---|---|---|---|
| 2019/0342057 | A1* | 11/2019 | Rico Alvarino | H04W 72/00 |
| 2019/0373627 | A1* | 12/2019 | Luo | H04W 72/1226 |
| 2020/0015236 | A1* | 1/2020 | Kung | H04W 16/14 |
| 2020/0029320 | A1* | 1/2020 | Ryu | H04B 7/088 |
| 2021/0136726 | A1* | 5/2021 | Niu | H04W 48/08 |
| 2021/0227409 | A1* | 7/2021 | Siomina | H04W 72/046 |
| 2021/0352697 | A1* | 11/2021 | Irukulapati | H04W 48/16 |

OTHER PUBLICATIONS

Author Unknown, "Technical Specification Group Radio Access Network; NR; Physical channels and modulation (Release 15)," Technical Specification 38.211, Version 15.2.0, 3GPP Organizational Partners, Jun. 2018, 93 pages.
Author Unknown, "Technical Specification Group Radio Access Network; NR; Physical layer procedures for control (Release 15)," Technical Specification 38.213, Version 15.2.0, 3GPP Organizational Partners, Jun. 2018, 98 pages.
Author Unknown, "Technical Specification Group Radio Access Network; NR; Radio Resource Control (RRC) protocol specification (Release 15)," Technical Specification 38.331, Version 15.2.1, 3GPP Organizational Partners, Jun. 2018, 303 pages.
CMCC, "R1-1809973: Draft summary on Study on NR-RIM," Third Generation Partnership Project (3GPP), TSG RAN WG1 Meeting #94, Aug. 20-24, 2018, 30 pages, Gothenburg, Sweden.
Huawei, et al., "R1-1808067: Discussion on remote interference mitigation mechanisms," Third Generation Partnership Project (3GPP), TSG RAN WG1 Meeting #94, Aug. 20-24, 2018, 4 pages, Gothenburg, Sweden.
Qualcomm Incorporated, "R1-1809456: Mechanisms for identifying strong gNB interferers," Third Generation Partnership Project (3GPP), TSG RAN WG1 Meeting #94, Aug. 20-24, 2018, 3 pages, Gothenburg, Sweden.
Sony, "R1-1808342: Considerations on remote interference management," Third Generation Partnership Project (3GPP), TSG RAN WG1 Meeting #94, Aug. 20-24, 2018, 3 pages, Gothenburg, Sweden.
International Search Report and Written Opinion for International Patent Application No. PCT/SE2019/050807, dated Nov. 21, 2019, 13 pages.
ETRI, "R1-1718004: Remaining details on RACH procedure," 3GPP TSG RAN WG1 Meeting #90bis, Oct. 9-13, 2017, Prague, Czech Republic, 9 pages.
Qualcomm Incorporated, "R1-1802814: Remaining details on RACH procedure," 3GPP TSG-RAN WG1 Meeting RAN1 92, Feb. 26-Mar. 2, 2018, Athens, Greece, 13 pages.
Extended European Search Report for European Patent Application No. 19864065.8, dated Mar. 15, 2022, 12 pages.
CATT, "R1-1808396: Initial Access and Mobility for NR Unlicensed Operations," 3GPP TSG RAN WG1 Meeting #94, Aug. 20-24, 2018, Gothenburg, Sweden, 4 pages.
Partial Supplementary European Search Report for European Patent Application No. 19864065.8, dated Nov. 3, 2021, 13 pages.

* cited by examiner

SSB TO RO MAPPING AGAINST REMOTE INTERFERENCE

RELATED APPLICATIONS

This application is a 35 U.S.C. § 371 national phase filing of International Application No. PCT/SE2019/050807, filed Aug. 28, 2019, which claims the benefit of provisional patent application Ser. No. 62/736,810, filed Sep. 26, 2018 and provisional patent application Ser. No. 62/736,803, filed Sep. 26, 2018, the disclosures of which are hereby incorporated herein by reference in their entireties.

TECHNICAL FIELD

The present disclosure relates to a wireless network and, in particular, to mitigating remote interference in a wireless network.

BACKGROUND

Random Access Procedure

A Random Access (RA) procedure is a key function in a cellular system. In Third Generation Partnership Project (3GPP) New Radio (NR), a User Equipment (UE) that would like to access the network initiates the RA procedure by transmitting a preamble (Msg1) in the uplink (UL) on the Physical Random Access Channel (PRACH). A next generation Node B or NR base station (gNB) (or Transmission and Reception Point (TRP), i.e. a base station, access node) receiving the preamble and detecting the RA attempt will respond in the downlink (DL) by transmitting a RA Response (RAR, Msg2). The RAR carries an UL scheduling grant for the UE to continue the procedure by transmitting a following subsequent message in the UL (Msg3) for terminal identification, on the Physical Uplink Shared Channel (PUSCH). This procedure is illustrated in FIG. 1.

Before transmission of the PRACH preamble, the UE receives both a set of synchronization signals and configuration parameters on a broadcast channel in a so-called Synchronization Signal Block (SS-block or SSB), which contains a NR Primary Synchronization Signal (NR-PSS), a NR Secondary Synchronization Signal (NR-SSS), and a NR Physical Broadcast Channel (NR-PBCH), possibly complemented with configuration parameters received on yet another channel. Note that an SSB is sometimes referred to as an SS/PBCH block.

NR PRACH Configuration

NR supports a set of N preambles in a cell that are found by:
- including first all the available cyclic shifts of a root Zadoff-Chu sequence,
- including secondly in the order of increasing root index,
- including thirdly in the order of increasing frequency allocation, where the increase is in units of one frequency allocation for one PRACH preamble,
- including fourthly in the order of increasing time shift within a slot,
- including fifthly in the order of increasing time slot.

The iteration over cyclic shifts and roots (i.e., the first two steps above) are only performed until 64 preambles have been generated for the PRACH occasion, after which the iteration proceeds by increasing frequency allocation (i.e., the third step).

In NR, the time and frequency resource on which a PRACH preamble is transmitted is defined as a PRACH occasion.

The time resources and preamble format for a PRACH transmission is configured by a PRACH configuration index, which indicates a row in a PRACH configuration table specified in 3GPP Technical Specification (TS) 38.211 V15.2.0 Tables 6.3.3.2-2, 6.3.3.2-3, 6.3.3.2-4 for FR1 paired spectrum, FR1 unpaired spectrum, and FR2 with unpaired spectrum, respectively. Part of the Table 6.3.3.2-3 for FR1 unpaired spectrum for PRACH preamble format 0 is reproduced in Table 1 below, where the value of x indicates the PRACH configuration period in number of system frames and the value of y indicates the system frame within each PRACH configuration period on which the PRACH occasions are configured. For instance, if y is set to 0, then this means PRACH occasions are only configured in the first frame of each PRACH configuration period. The values in the column "subframe number" indicates which subframes are configured with the PRACH occasion. The values in the column "starting symbol" are the symbol indices.

TABLE 1

PRACH configuration for preamble format 0 for FR1 unpaired spectrum

| PRACH Configuration Index | Preamble format | $n_{SFN}$ mod x = y x | y | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |

TABLE 1-continued

PRACH configuration for preamble format 0 for FR1 unpaired spectrum

| PRACH Configuration Index | Preamble format | $n_{SFN} \mod x = y$ | | Subframe number | Starting symbol | Number of PRACH slots within a subframe | $N_t^{RA,\,slot}$, number of time-domain PRACH occasions within a PRACH slot | $N_{dur}^{RA}$, PRACH duration |
|---|---|---|---|---|---|---|---|---|
| | | x | y | | | | | |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | — | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In the frequency domain, NR supports multiple frequency-multiplexed PRACH occasions on the same time domain PRACH occasion. This is mainly motivated by the support of analog beam sweeping in NR such that the PRACH occasions associated to one SSB are configured at the same time instance but different locations. The number of PRACH occasions frequency-multiplexed in one time domain PRACH occasion can be 1, 2, 4, or 8. FIG. 2 gives an example of the PRACH occasion configuration in NR.

Association of SSB to PRACH Occasion (RO)

For Contention Based (CB) RA, the association (i.e., the mapping) from SSBs to PRACH preambles is done by consecutively associating (i.e., mapping) #CB-preambles-per-SSB preambles to each SSB.

From 3GPP TS 38.213 V15.2.0 section 8.1, regarding the SSB index to RO mapping, a UE is provided a number N of SSBs associated with one PRACH occasion and a number R of CB preambles per SSB per valid PRACH occasion by higher layer parameter ssb-perRACH-OccasionAndCB-PreamblesPerSSB If N<1, one SSB is mapped to 1/N consecutive valid PRACH occasions. This is to support one SSB mapped to multiple PRACH occasions, e.g., N=¼ in the upper plot in FIG. 3 and N=½ in FIG. 5.

If N≥1, R CB preambles with consecutive indexes associated with SSB n (where 0≤n≤N−1) per valid PRACH occasion start from preamble index n. totalNumberOfRA−Preambles/IN, where totalNumberOfRA−Preambles is an integer multiple of N This is to support multiple SSBs mapped to the same PRACH occasion, e.g., N=1 in the bottom plot in FIG. 3 and N=1 in FIG. 4. In this case, different SSBs are differentiated by using different preamble indices. SSB indexes are mapped to valid PRACH occasions in the following order where the parameters are described in 3GPP TS 38.211.

First, in increasing order of preamble indexes within a single PRACH occasion.

Second, in increasing order of frequency resource indexes for frequency multiplexed PRACH occasions.

Third, in increasing order of time resource indexes for time multiplexed PRACH occasions within a PRACH slot.

Fourth, in increasing order of indexes for PRACH slots.

The following parameters related to the SSB per PRACH occasion are configured by gNB in SIB1:

Number of SSBs that are mapped to each PRACH occasion (SSBs-per-PRACH-occasion, that is, the number N mentioned in the above text) can be ⅛, ¼, ½, 1, 2, 4, 8, or 16. (Values<1 means one SSB maps to multiple consecutive PRACH occasions).

Number of CB-preambles-per-SSB (per PRACH occasion)

If #SSBs-per-PRACH-occasion∈{⅛, ¼, ½, 1, 2}:
  #CB-preambles-per-SSB is selected from the set of values 4*N, with N=1, . . . , floor(16/max(1, #SSBs-per-PRACH-occasion))

If #SSBs-per-PRACH-occasion∈{4, 8, 16}:
  #CB-preambles-per-SSB is selected from the set of values N, with N=1, . . . , floor(64/#SSBs-per-PRACH-occasion)

Note that the parameters SSBs-per-PRACH-occasion and CB-preambles-per-SSB are jointly encoded in the higher-layer parameter ssb-perRACH-OccasionAndCB-PreamblesPerSSB, see TS 38.331.

In FIG. 3, an example is given to show the mapping. Each shaded box represents a PRACH occasion, the text "SSBm (n)" in each box denotes a PRACH occasion index number n within a PRACH configuration period, and this PRACH occasion is associated to SSB m. The PRACH configuration period is assumed to be 80 milliseconds (ms), and the SSB burst period is assumed to be 80 ms. The number of SSBs transmitted in one SSB burst period is 8. FIG. 3 shows two examples where not all PRACH occasions within a PRACH configuration period are needed to map all SSBs. The remaining PRACH occasions within a PRACH configuration are left unused.

Visual views of other examples of SSB to PRACH occasion mapping are shown in FIG. 4 and FIG. 5. FIG. 4 illustrates an example of one SSB per PRACH occasion. FIG. 5 illustrates an example with two SSBs per PRACH occasion.

Interference Protection in Time Division Duplexing (TDD) Networks

Wireless cellular networks are built up of cells, each cell defined by a certain coverage area of a radio Base Station (BS). The BSs communicate with terminals/UEs in the network wirelessly. The communication is carried out in either paired or unpaired spectrum. In case of paired spectrum, the DL and UL directions are separated in frequency, and this is called Frequency Division Duplexing (FDD). In case of unpaired spectrum, the DL and UL use the same spectrum, and this is called TDD. As the name implies, the DL and UL transmissions in the case of TDD are separated in the time domain, using typically a guard period between DL and UL transmission/reception. The guard period serves several purposes. Most essentially, the processing circuitry at the BS and UE needs sufficient time to switch between transmission and reception; however, this is typically a fast procedure and does not significantly contribute to the requirement of the guard period size. In addition, the guard period must be sufficiently large to allow a UE to receive a (time-delayed) DL grant scheduling the UL and transmit the UL signal with proper timing advance (compensating for the propagation delay) such that it is received in the UL part of the frame at the BS. Thus, the guard period should be larger than two times the propagation time towards a UE at the cell edge; otherwise, the UL and DL signals in the cell will interfere. Because of this, the guard period is typically chosen to depend on the cell size such that larger cells (i.e., larger inter-site distances) have a larger guard period and vice versa.

Additionally, the guard period is used to reduce DL-to-UL interference between BSs by allowing a certain propagation delay between cells without having the DL transmission of a first BS enter the UL reception of a second BS. In a typical macro network, the DL transmission power can be on the order of 20 decibels (dB) larger than the UL transmission power. Hence, if the UL is interfered by the DL of other cells (so called cross-link interference), the UL performance can be seriously degraded. Because of the large transmit power discrepancy between UL and DL, cross-link interference can be detrimental to system performance not only for the co-channel case where DL interferes UL on the same carrier but also for the adjacent channel case where DL of one carrier interferes with UL on an adjacent carrier. Because of this, TDD macro networks are typically operated in a synchronized fashion where the symbol timing is aligned, and a semi-static TDD UL/DL pattern is used which is the same for all the cells in the network. Typically, operators with adjacent TDD carriers also synchronize their TDD UL/DL patterns to avoid adjacent channel cross-link interference.

The principle with applying a guard period to avoid DL-to-UL interference between BSs is shown in FIG. 6 where a victim BS (V) is being (at least potentially) interfered by an aggressor (A). The aggressor is sending a DL signal to a device in its cell. This DL signal also reaches the victim BS (i.e., the propagation loss is not enough to protect the victim BS from the signals of A). The signal is propagated a distance (d) and, due to propagation delay, the experienced frame structure alignment of A at V is shifted/delayed $\tau$ seconds, proportional to the propagation distance d. As can be seen from FIG. 6, although the DL part of the aggressor BS (A) is delayed, it does not enter the UL region of the victim (V) due to the guard period used. In this manner, the system design serves its purpose.

It could be noted that the terminology victim and aggressor are only used here to illustrate why typical TDD systems are designed as they are. The victim can also act as an aggressor and vice versa since there is channel reciprocity between the BSs.

Uplink-Downlink Configurations in TDD

In TDD, some subframes/slots are allocated for UL transmissions and some subframes/slots are allocated for DL transmissions. The switch between DL and UL occurs in the so called special subframes in Long Term Evolution (LTE) or in the so called flexible slots in NR.

In LTE, seven different UL-DL configurations are provided, see Table 2 below.

TABLE 2

LTE uplink-downlink configurations (from 36.211, Table 4.2-2)

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period, and hence the number of symbols for Downlink Pilot Time Slot (DwPTS) and Uplink Pilot Time Slot (UpPTS) in the special subframe, can also be configured from a set of possible selections.

NR on the other hand provides many different UL-DL configurations. There are 10 to 320 slots per radio frame, where each radio frame has a duration of 10 ms, depending on subcarrier spacing. The Orthogonal Frequency Division Multiplexing (OFDM) symbols in a slot are classified as 'downlink' (denoted 'D'), 'flexible' (denoted 'X'), or 'uplink' (denoted 'U'). A semi-static TDD UL-DL configuration may be used where the TDD configuration is Radio Resource Control (RRC) configured using the Information Element (IE) TDD-UL-DL-ConfigCommon:

```
TDD-UL-DL-ConfigCommon ::=        SEQUENCE {
    -- Reference SCS used to determine the time domain boundaries in
    the UL-DL pattern which must be common across all subcarrier
    specific
        -- virtual carriers, i.e., independent of the actual subcarrier
    spacing using for data transmission.
        -- Only the values 15 or 30 kHz (<6GHz), 60 or 120 kHz (>6GHz)
    are applicable.
```

```
    -- Corresponds to L1 parameter 'reference-SCS' (see 38.211,
section FFS_Section)
        referenceSubcarrierSpacing           SubcarrierSpacing
                                      OPTIONAL,
    -- Periodicity of the DL-UL pattern. Corresponds to L1 parameter
'DL-UL-transmission-periodicity' (see 38.211, section FFS_Section)
        dl-UL-TransmissionPeriodicity        ENUMERATED {ms0p5, ms0p625, ms1,
ms1p25, ms2, ms2p5, ms5, ms10}               OPTIONAL,
    -- Number of consecutive full DL slots at the beginning of each
DL-UL pattern.
    -- Corresponds to L1 parameter 'number-of-DL-slots' (see 38.211,
Table 4.3.2-1)
        nrofDownlinkSlots                    INTEGER (0..maxNrofSlots)
                                      OPTIONAL,
    -- Number of consecutive DL symbols in the beginning of the slot
following the last full DL slot (as derived from
nrofDownlinkSlots).
    -- If the field is absent or released, there is no partial-
downlink slot.
    -- Corresponds to L1 parameter 'number-of-DL-symbols-common'
(see 38.211, section FFS_Section).
        nrofDownlinkSymbols                  INTEGER (0..maxNrofSymbols-1)
                                      OPTIONAL, -- Need R
    -- Number of consecutive full UL slots at the end of each DL-UL
pattern.
    -- Corresponds to L1 parameter 'number-of-UL-slots' (see 38.211,
Table 4.3.2-1)
        nrofUplinkSlots                      INTEGER (0..maxNrofSlots)
                                      OPTIONAL,
    -- Number of consecutive UL symbols in the end of the slot
preceding the first full UL slot (as derived from nrofUplinkSlots).
    -- If the field is absent or released, there is no partial-
uplink slot.
    -- Corresponds to L1 parameter 'number-of-UL-symbols-common'
(see 38.211, section FFS_Section)
        nrofUplinkSymbols                    INTEGER (0..maxNrofSymbols-1)
                                             OPTIONAL -- Need R
```

Alternatively, the slot format can be dynamically indicated with a Slot Format Indicator (SFI) conveyed with Downlink Control Information (DCI) Format 2_0. Regardless of whether dynamic or semi-static TDD configuration is used in NR, the number of UL and DL slots, as well as the guard period (the number of UL and DL symbols in the flexible slot(s)) may be almost arbitrarily configured within the TDD periodicity. This allows for very flexible UL-DL configurations.

Atmospheric Ducting

In certain weather conditions and in certain regions of the world, a ducting phenomenon can happen in the atmosphere. The appearance of the duct is dependent on, for example, temperature and humidity. When the duct appears, it can "channel" the signal to help it propagate a significantly longer distance than if the duct was not present. An atmospheric duct is a layer in which rapid decrease in the refractivity of the lower atmosphere (the troposphere) occurs. In this way, atmospheric ducts can trap the propagating signals in the ducting layer, instead of radiating out in space. Thus, most of the signal energy propagates in ducting layer, which acts as a wave guide. Therefore, trapped signals can propagate through beyond-line-of-sight distances with relatively low path loss, sometimes even lower than in line-of-sight propagation.

A ducting event is typically temporary and can have a time duration from a couple of minutes to several hours.

Combining the knowledge of the TDD system design and the presence of an atmospheric duct, the distance d in FIG. 6, where an aggressor BS can interfere with a victim BS, is greatly increased. Since the phenomenon is only appearing in certain parts of the world under certain conditions, this has typically not been considered in designs of cellular systems using unpaired spectrum. The implication is that a DL transmission can suddenly enter the UL region as interference (I). This is illustrated in FIG. 7.

Remote Interference Management (RIM)

To mitigate DL-to-UL interference occurring due to ducting events in TDD macro deployments (so called remote interference), several mechanisms exists. For instance, the aggressor BS may increase its guard period and thereby reduce the number of DL symbols in its cell. While this reduces DL capacity in the aggressor cell, it may reduce the UL interference level in the victim cell and therefore be beneficial to the overall network performance. As such a measure mutes resources in one cell to protect resources in another cell, it is crucial to only apply the mechanism when the remote BS aggressor is actually causing interference to the victim, i.e. when a tropospheric ducting event occurs. Thus, the (potential) aggressor BS needs to be made aware that it is causing interference to a (potential) victim BS in order to know when to apply the remote interference mitigation mechanism.

In some proposed remote interference mitigation schemes, the victim of remote interference transmits a Reference Signal (RS) in certain time locations in order to make aggressor(s) aware that they are causing interference to the victim. Since the propagation channel is reciprocal in TDD systems, the aggressor would receive the RS at the same signal strength as the victim receives the aggressor's interfering signal, given that the same transmit power and transmit/receive antenna patterns are used for both transmissions. A potential aggressor BS would then monitor certain time locations for RSs transmitted by potential victims and, upon detection of an RS sequence, the potential aggressor BS would infer that it is causing remote interference to a certain victim BS, whereon it may apply a remote interference mitigation mechanism. Such an RS is typically transmitted by the victim at the end of the DL region (i.e., right before the Guard Period (GP)) and the potential aggressor monitors the start of the UL region (i.e., right after the GP) for transmitted RSs. One such RIM framework is illustrated in FIG. 8.

Summary

Systems and methods are disclosed herein for mapping Synchronization Signal Blocks (SSBs) to transmit beam directions taking into account remote interference. In this regard, embodiments of a method performed by a base station in a cellular communications network are disclosed. In some embodiments, a method performed by a base station in a cellular communications network comprises determining a beam direction to SSB index mapping, taking into consideration remote interference. The method further comprises using the beam direction to SSB index mapping. Because the SSBs have corresponding Physical Random Access Channel (PRACH) occasions, determining the beam direction to SSB index mapping taking into account remote interference improves PRACH preamble robustness.

In some embodiments, determining the beam direction to SSB index mapping comprises measuring remote interference on a plurality of beam directions and performing a mapping between SSBs and the plurality of beam directions based on the measured remote interference on the plurality of beam directions. In some embodiments, performing the mapping between the SSBs and the plurality of beam directions comprises performing the mapping between the SSBs and the plurality of beam directions such that one or more of the SSBs that correspond to PRACH occasions that are robust to remote interference are mapped to one or more beam directions having a relatively high level of remote interference, respectively. In some embodiments, the cellular communications network is a Time Division Duplexing (TDD) network, and the PRACH occasions that are robust to remote interference are PRACH occasions that are furthest away from a start of a respective uplink period of the TDD network.

In some embodiments, using the beam direction to SSB index mapping comprises transmitting SSBs on transmit beams in accordance with the determined beam direction to SSB index mapping.

In some embodiments, the method further comprises detecting and processing a PRACH preamble on a PRACH occasion in accordance with the beam direction to SSB index mapping.

In some embodiments, the beam direction to SSB index mapping is static. In some other embodiments, the beam direction to SSB index mapping is semi-static.

In some embodiments, the beam direction to SSB index mapping is such that transmit beam directions that experience relatively high remote interference are mapped to SSBs with corresponding PRACH occasions that are robust to remote interference.

In some embodiments, the cellular communications network is a TDD network, and the beam direction to SSB index mapping is such that transmit beam directions that experience relatively high remote interference are mapped to SSBs with corresponding PRACH occasions that are furthest away from a start of a respective uplink period of the TDD network.

In some embodiments, the beam direction to SSB index mapping comprises a first mapping between SSBs and PRACH occasions is predefined and a second mapping between the SSBs and transmit beam directions at the respective base station is defined taking remote interference into consideration.

Embodiments of a base station are also disclosed. In some embodiments, a base station for a cellular communications network is adapted to determine a beam direction to SSB index mapping, taking into consideration remote interference, and use the beam direction to SSB index mapping. In some embodiments, the base station comprises processing circuitry configured to cause the base station to determine the beam direction to SSB index mapping, taking into consideration remote interference, and use the beam direction to SSB index mapping.

In some other embodiments, a method performed by a base station in a cellular communications network comprises determining a beam direction that experiences at least a threshold level of remote interference and nulling the beam direction during transmission.

Embodiments of a method performed by a wireless device are also disclosed. In some embodiments, a method performed by a wireless device in a cellular communications network comprises detecting a SSB and transmitting a PRACH preamble on a PRACH occasion mapped to the detected SSB, where a mapping between SSBs and transmit beam directions at a respective base station is defined taking remote interference into consideration.

In some embodiments, the mapping between SSBs and transmit beam directions is static. In some other embodiments, the mapping between SSBs and transmit beam directions is semi-static.

In some embodiments, the mapping between SSBs and transmit beam directions is such that transmit beam directions that experience relatively high remote interference are mapped to SSBs with corresponding PRACH occasions that are robust to remote interference.

In some embodiments, the cellular communications network is a TDD network, and the mapping between SSBs and transmit beam directions is such that transmit beam directions that experience relatively high remote interference are mapped to SSBs with corresponding PRACH monitoring occasions that are furthest away from a start of a respective uplink period of the TDD network.

In some embodiments, the mapping between SSBs and transmit beam directions at the respective base station comprises a first mapping between SSBs and PRACH occasions is predefined and a second mapping between the SSBs and transmit beam directions at the respective base station is defined taking remote interference into consideration.

Embodiments of a wireless device are also disclosed. In some embodiments, a wireless device for a cellular communications network is adapted to detect a SSB and transmit a PRACH preamble on a PRACH occasion mapped to the detected SSB, where a mapping between SSBs and transmit beam directions at a respective base station is defined taking remote interference into consideration. In some embodiments, the wireless device comprises one or more transmitters, one or more receivers, and processing circuitry associated with the one or more transmitters and the one or more receivers, where the processing circuitry is configured to cause the wireless device to detect the SSB and transmit the PRACH preamble on the PRACH occasion mapped to the detected SSB, where the mapping between SSBs and transmit beam directions at the respective base station is defined taking remote interference into consideration.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
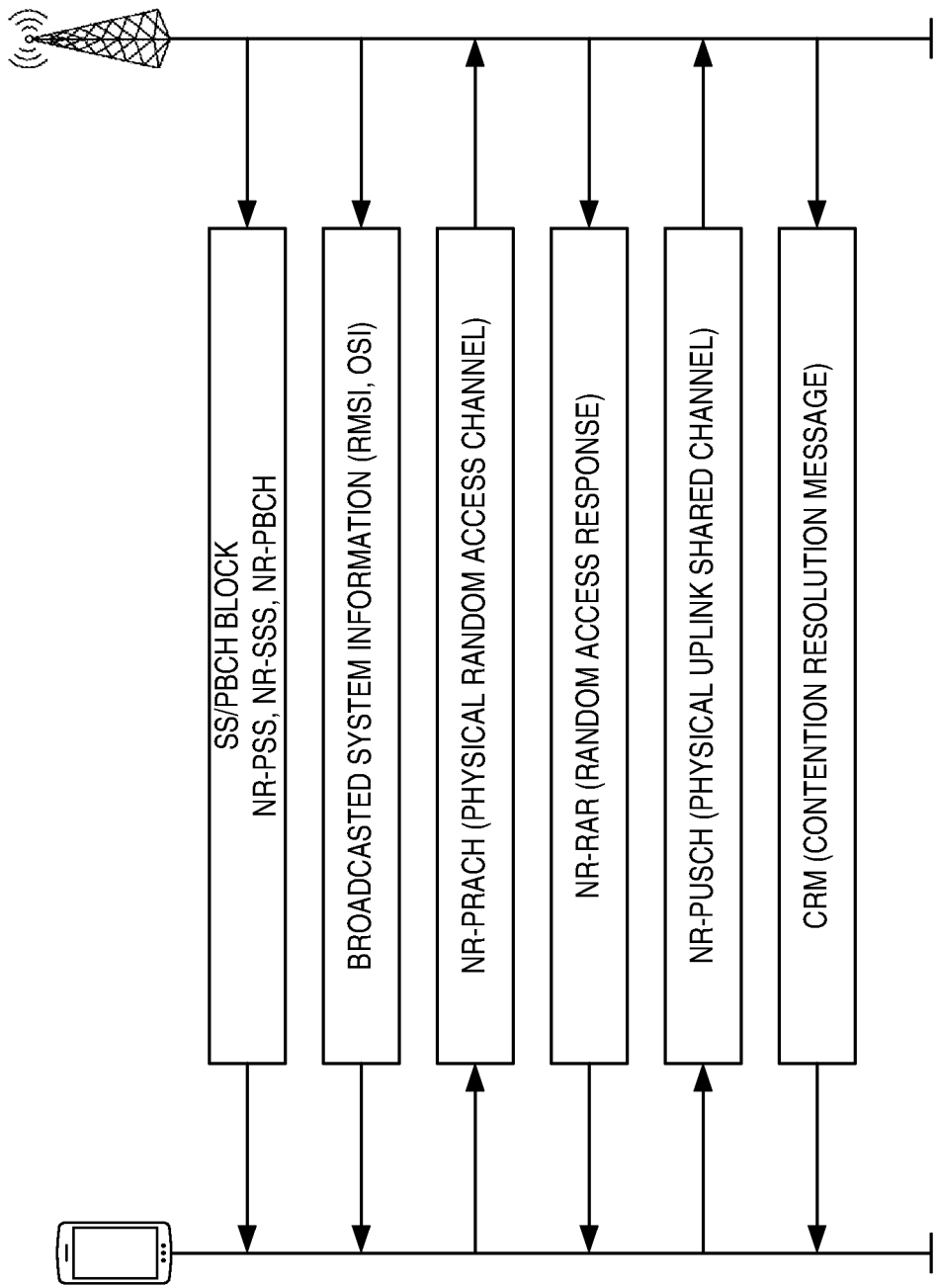
FIG. 1 illustrates the four step initial access procedure in New Radio (NR)
Figure 2:
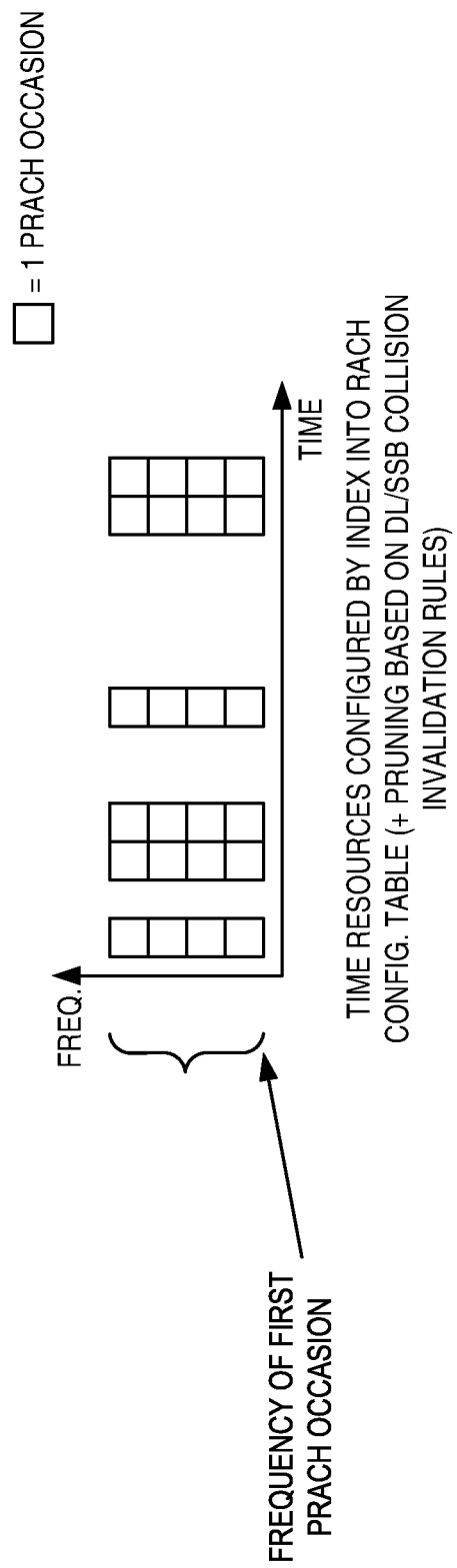
FIG. 2 illustrates a Physical Random Access Channel (PRACH) configuration in NR.
Figure 3:
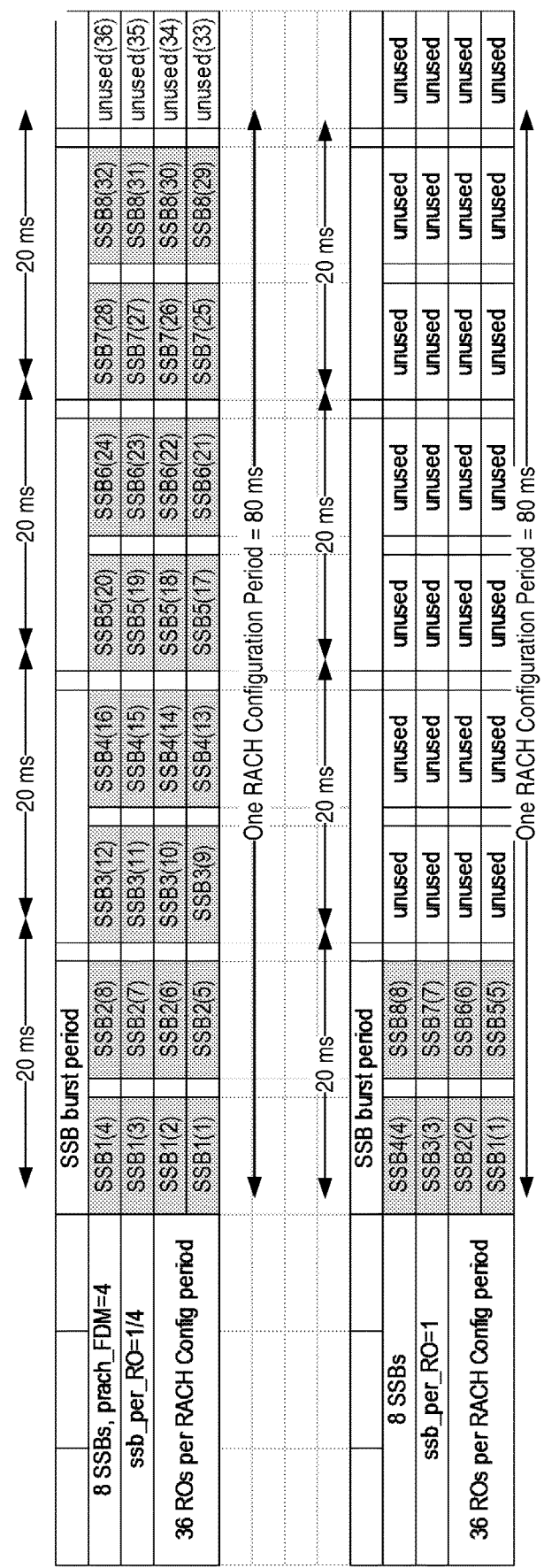
FIG. 3 illustrates an example in which all Synchronization Signal Blocks (SSBs) can be mapped within a PRACH configuration period.
Figure 4:
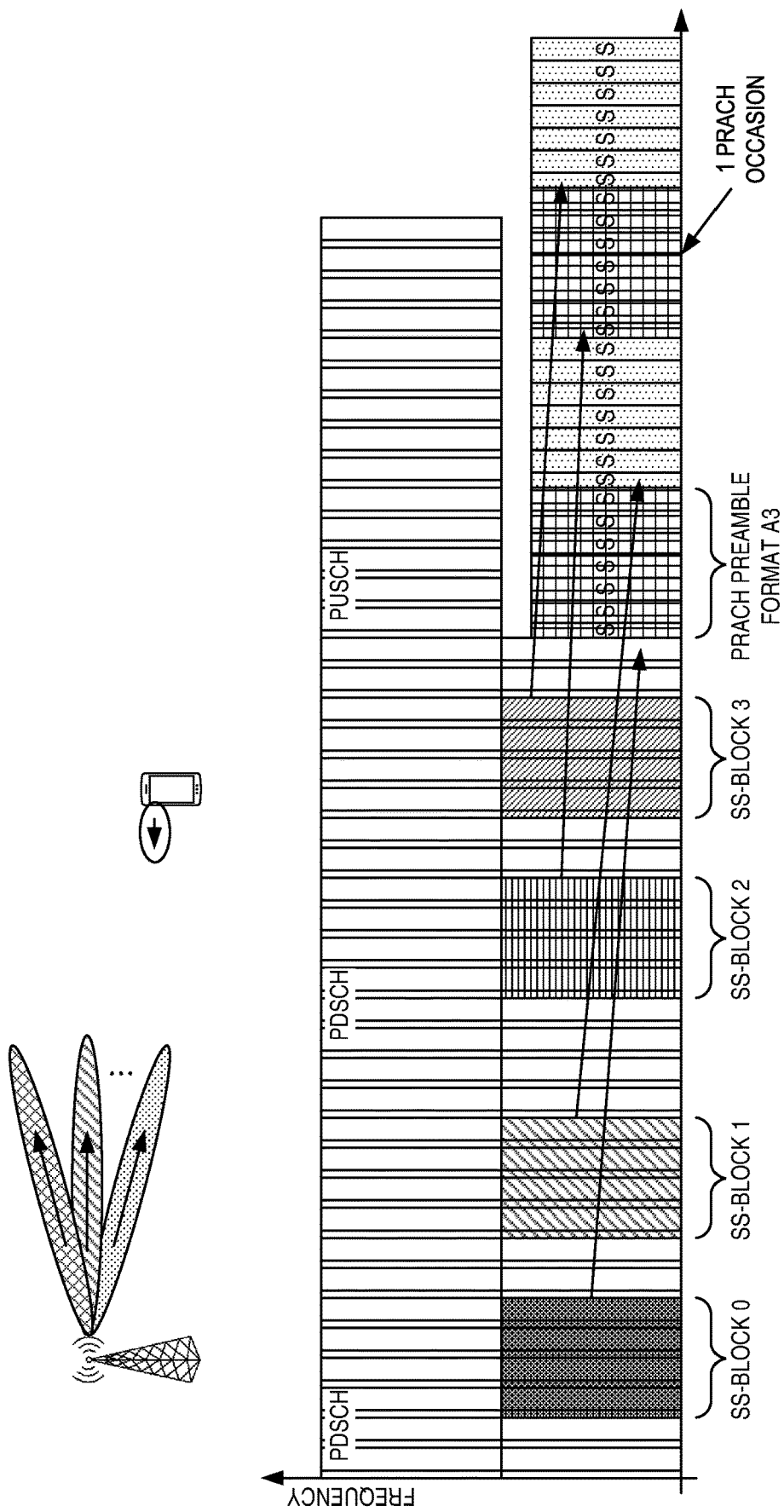
FIG. 4 illustrates an example of SSB to PRACH occasion mapping with SSB per PRACH occasion.
Figure 5:
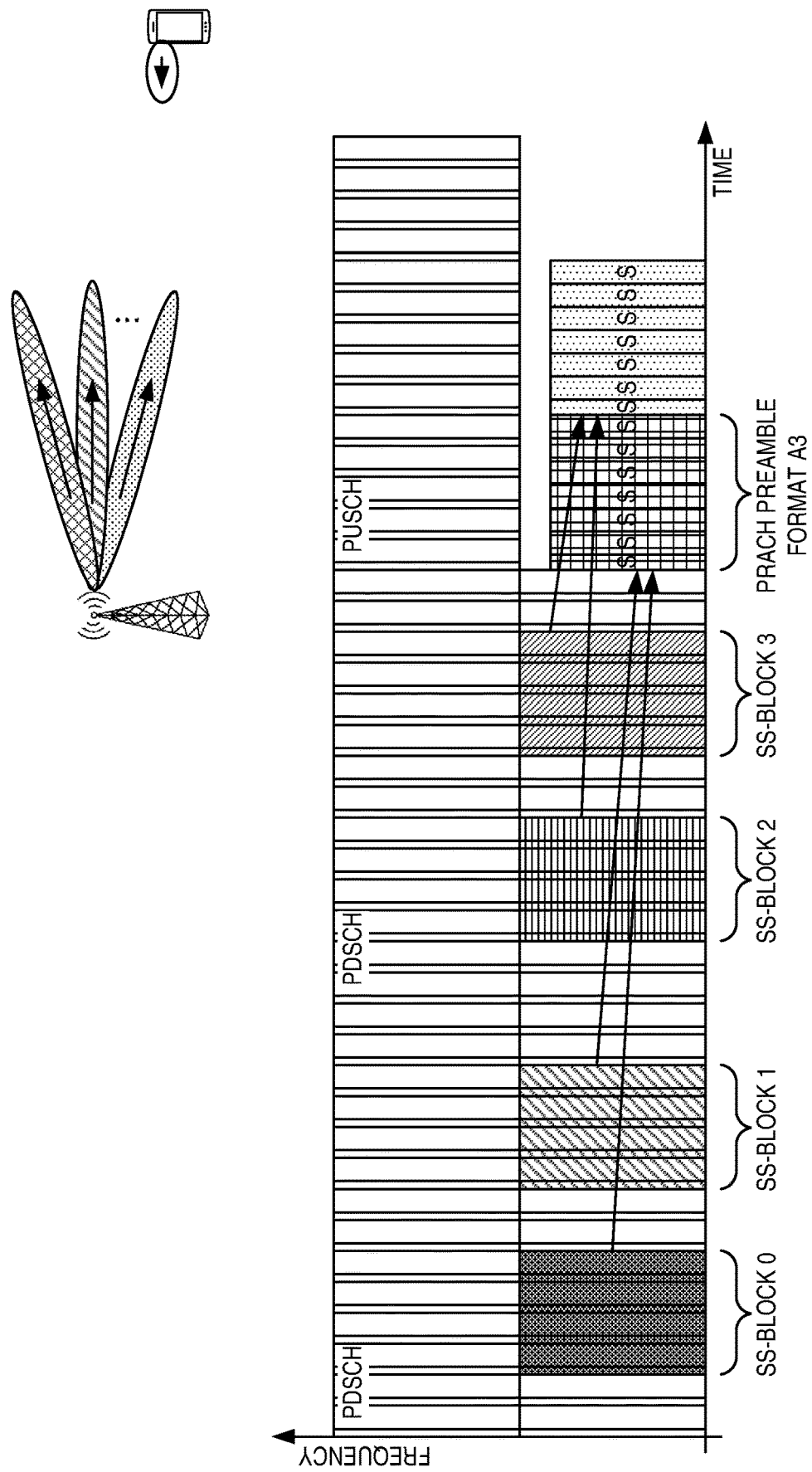
FIG. 5 illustrates an example of SSB to PRACH occasion mapping with two SSBs per PRACH occasion.
Figure 6:
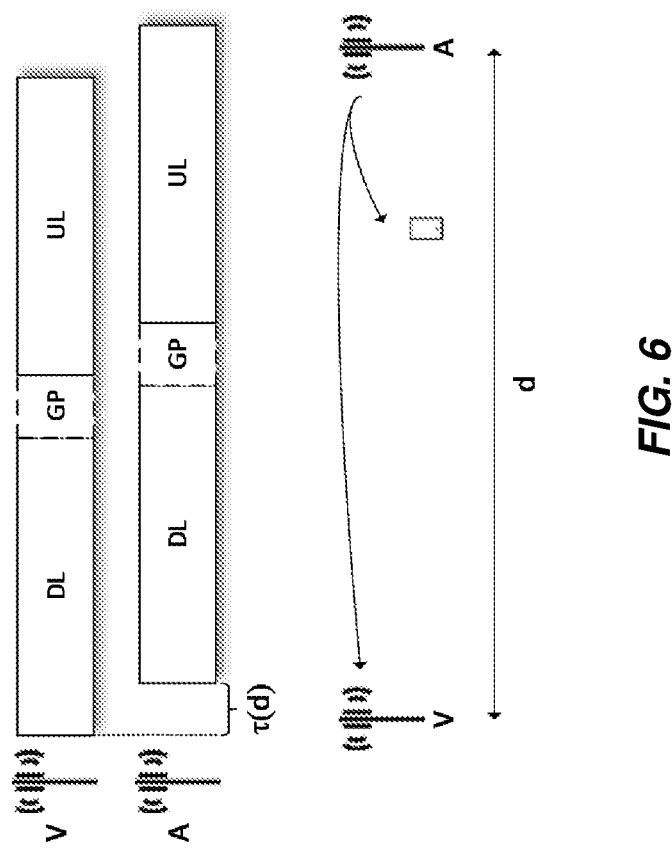
FIG. 6 illustrates a Time Division Duplexing (TDD) Guard Period (GP) design that avoids downlink (DL) to uplink (UL) interference between base stations.
Figure 7:
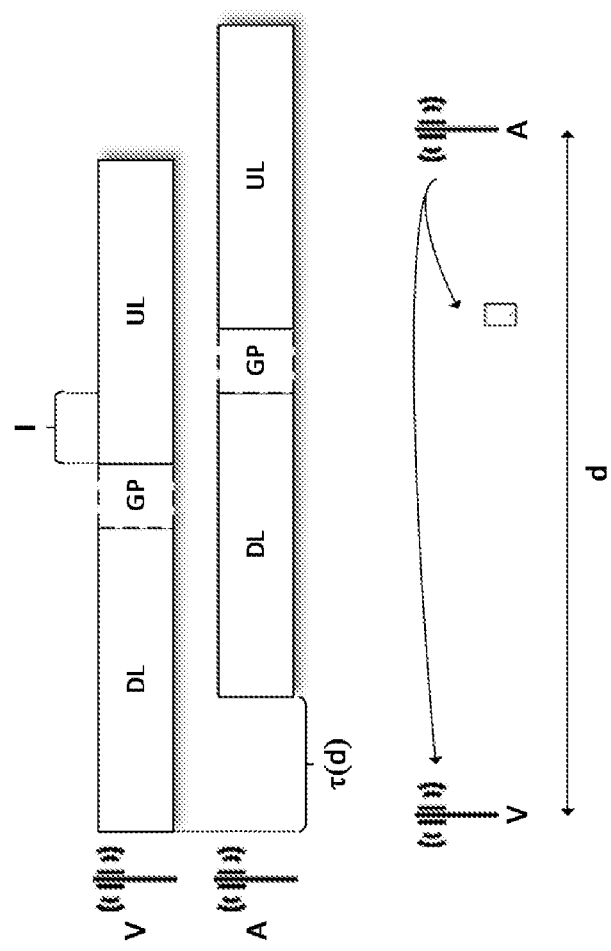
FIG. 7 illustrates remote interference due to an atmospheric duct.
Figure 8:
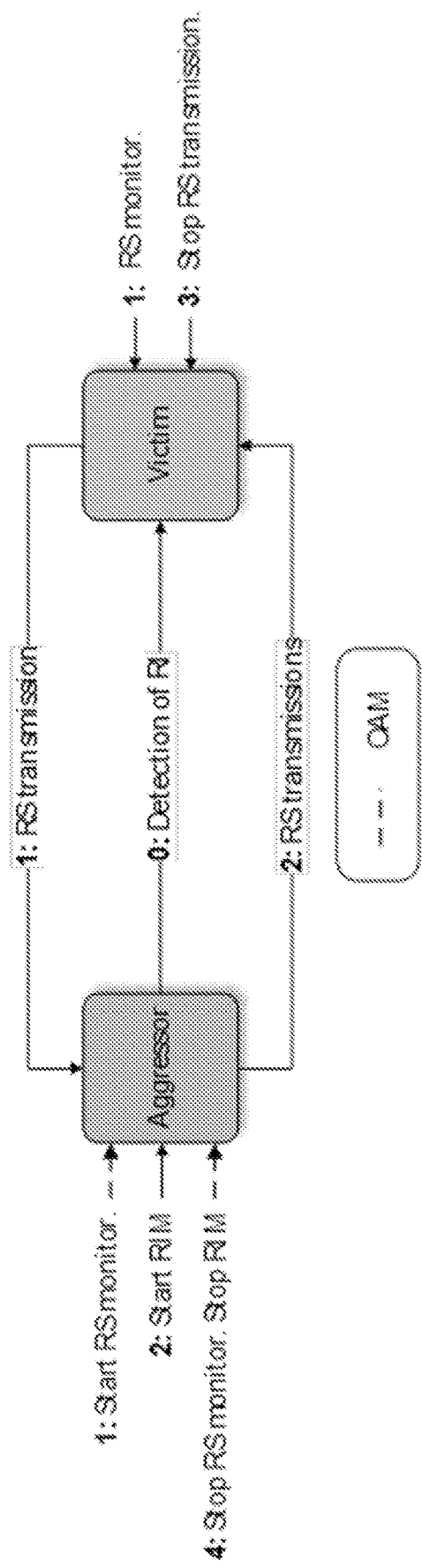
FIG. 8 illustrates a framework for Remote Interference Management (RIM)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In the present disclosure, a network node is referred to as a base station. This is a more general term and can correspond to any type of radio network node or any network node, which communicates with a User Equipment (UE) and/or with another network node. Examples of network nodes are a Node B, a Base Station (BS), a Multi-Standard Radio (MSR) radio node such as an MSR BS, an enhanced or evolved Node B (eNB), a New Radio (NR) BS (gNB), a Master eNB (MeNB), a Secondary eNB (SeNB), a network controller, a Radio Network Controller (RNC), a BS Controller (BSC), a Road Side Unit (RSU), a relay, a donor node controlling relay, a Base Transceiver Station (BTS), an Access Point (AP), transmission points, transmission nodes, a Remove Radio Unit (RRU), a Remote Radio Head (RRH), nodes in a Distributed Antenna System (DAS), a core network node (e.g., a Mobile Switching Center (MSC), a Mobility Management Entity (MME), etc.), Operation and Maintenance (O&M), an Operations Support System (OSS), a Self-Organizing Network (SON), a positioning node (e.g., an Evolved Serving Mobile Location Center (E-SMLC)), etc.

Another example of a node could be user equipment. As used herein, the term "user equipment" or "UE" is a non-limiting term that refers to any type of wireless device communicating with a network node and/or with another UE in a cellular or mobile communication system. Examples of UE are a target device, a Device-to-Device (D2D) UE, a Vehicle-to-Everything (V2X) UE, a Proximity Service (ProSe) UE, a machine type UE or a UE capable of Machine-to-Machine (M2M) communication, a Personal Digital Assistant (PDA), an iPad, a tablet, mobile terminals, a smart phone, Laptop Embedded Equipment (LEE), Laptop Mounted Equipment (LME), Universal Serial Bus (USB) dongles, etc.

The term radio access technology, or RAT, may refer to any RAT e.g. Universal Terrestrial Radio Access (UTRA), Evolved Universal Terrestrial Radio Access (E-UTRA), Narrowband Internet of Things (NB-IoT), WiFi, Bluetooth, next generation RAT (NR), Fourth Generation (4G), Fifth Generation (5G), etc. Any of the first and the second nodes may be capable of supporting a single or multiple RATs.

The term signal used herein can be any physical signal or physical channel. Examples of downlink physical signals are reference signals such as Primary Synchronization Signal (PSS), Secondary Synchronization Signal (SSS), Cell Specific Reference Signal (CRS), Positioning Reference Signal (PRS), Channel State Information Reference Signal (CSI-RS), Demodulation Reference Signal (DMRS), Narrowband Reference Signal (NRS), NB-IoT PSS (NPSS), NB-IoT SSS (NSSS), Synchronization Signal (SS), Multimedia Broadcast Multicast Service Single Frequency Network (MBSFN) Reference Signal (RS), etc. Examples of uplink physical signals are reference signals such as Sounding Reference Signal (SRS), DMRS, etc. The term physical channel (e.g., in the context of channel reception) used herein is also called channel. The physical channel carries higher layer information (e.g., Radio Resource Control (RRC), logical control channel, etc.). Examples of downlink physical channels are Physical Broadcast Channel (PBCH), Narrowband Physical Broadcasting Channel (NPBCH), Physical Downlink Control Channel (PDCCH), Physical Downlink Shared Channel (PDSCH), Short Transmit Time Interval (sTTI) PDSCH (sPDSCH), Massive Physical Downlink Control Channel (MPDCCH), Narrowband PDCCH (NPDCCH), Narrowband PDSCH (NPDSCH), Enhanced PDCCH (E-PDCCH), etc. Examples of uplink physical channels are sTTI Physical Uplink Control Channel (sPUCCH), sTTI Physical Uplink Shared Channel (sPUSCH), Physical Uplink Shared Channel (PUSCH), Physical Uplink Control Channel (PUCCH), Narrowband PUSCH (NPUSCH), Physical Random Access Channel (PRACH), Narrowband PRACH (NPRACH), etc.

The term time resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

There currently exist certain challenge(s). Fixed Synchronization Signal Block (SSB) beam direction to SSB index mapping and fixed SSB index to PRACH occasion mapping is not robust to remote interference, especially when a beam (e.g., beam0 mapped to SSB index 0) is affected by the remote interference and its associated PRACH occasions are located close to the Guard Period (GP).

Figure 9:
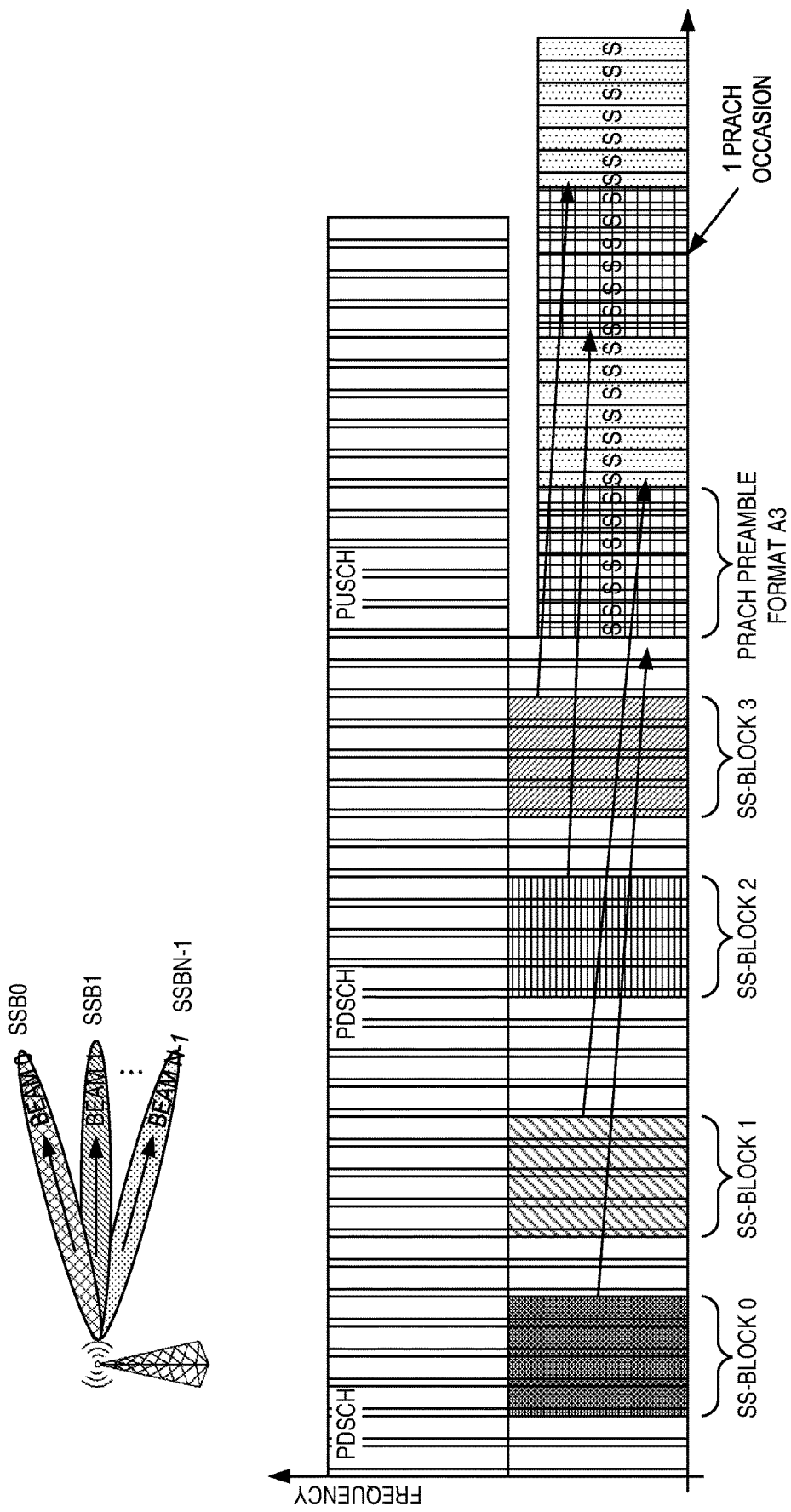
FIG. 9 illustrates one example of SSB index to PRACH occasion mapping according to Release 15 of the NR specifications, with a fixed SSB beam direction to SSB index mapping.

One example of Third Generation Partnership Project (3GPP) Release 15 (Rel-15) way of SSB to PRACH occasion mapping is shown in FIG. 9. In this example, there is fixed SSB beam direction to SSB index mapping. This type of mapping SSB to PRACH occasion might not be optimal during the remote interference situation.

Certain aspects of the present disclosure and their embodiments may provide solutions to the aforementioned or other challenges. In some embodiments, PRACH preamble (Msg1) uplink (UL) signal robustness towards remote interference can be achieved with the proposed solution of reordering of SSB to PRACH occasion (RO) mappings taking into account which victim beam got affected due to remote interference from aggressor gNB(s). In some embodiments, a new signaling mechanism for SSB to PRACH occasion mapping as a remote interference mitigation mechanism is provided.

Certain embodiments may provide one or more of the following technical advantage(s). The proposed solution can improve Msg1 robustness towards remote BS interference. Since Msg1 is part of initial access, which is necessary for a UE to establish a connection to the network, it is important to make sure that the scheduling of Msg1 is robust to remote interference.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Note that the description given herein focuses on a 3GPP cellular communications system and, as such, 3GPP terminology or terminology similar to 3GPP terminology is oftentimes used. However, the concepts disclosed herein are not limited to a 3GPP system.

Systems and methods are disclosed herein for improving Msg1 (i.e., PRACH preamble) UL signal robustness towards remote interference. In some embodiments, SSB to RO mappings are reordered, taking into account which victim beam got affected due to remote interference from aggressor gNB(s). In this manner, Msg1 UL signal robustness is improved.

Figure 10:
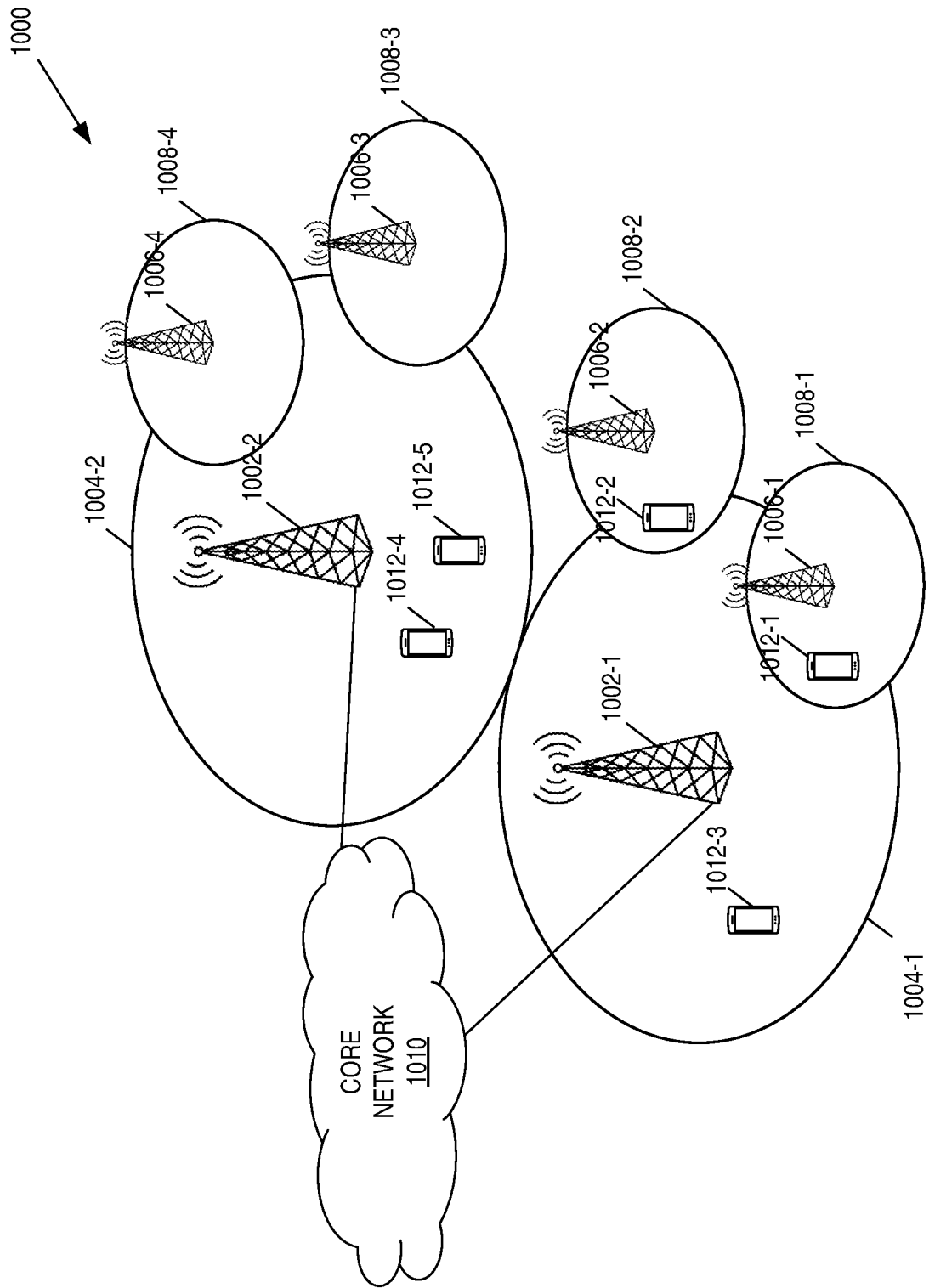
FIG. 10 illustrates one example of a cellular communications network in which embodiments of the present disclosure may be implemented.

In this regard, FIG. 10 illustrates one example of a cellular communications network 1000 according to some embodiments of the present disclosure. In the embodiments described herein, the cellular communications network 1000 is preferably a 5G NR network, but is not limited thereto. In this example, the cellular communications network 1000 includes base stations 1002-1 and 1002-2, which in 5G NR are referred to as gNBs, controlling corresponding macro cells 1004-1 and 1004-2. The base stations 1002-1 and 1002-2 are generally referred to herein collectively as base stations 1002 and individually as base station 1002. The base stations 1002 are sometimes referred to herein as gNBs. Likewise, the macro cells 1004-1 and 1004-2 are generally referred to herein collectively as macro cells 1004 and individually as macro cell 1004. The cellular communications network 1000 may also include a number of low power nodes 1006-1 through 1006-4 controlling corresponding small cells 1008-1 through 1008-4. The low power nodes 1006-1 through 1006-4 can be small base stations (such as pico or femto base stations) or RRHs, or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The base stations 1002 (and optionally the low power nodes 1006) are connected to a core network 1010.

The base stations 1002 and the low power nodes 1006 provide service to wireless devices 1012-1 through 1012-5 (e.g., UEs) in the corresponding cells 1004 and 1008. The wireless devices 1012-1 through 1012-5 are generally referred to herein collectively as wireless devices 1012 and individually as wireless device 1012. The wireless devices 1012 are also sometimes referred to herein as UEs.

Embodiments of the present disclosure utilize knowledge or an assumption that different beamforming directions, i.e., antenna virtualization, or "beams," may experience different levels of Remote Interference (RI). It is noted that it assumed that the gNB transmit (Tx) beam used to transmit the SSB and the gNB receive (Rx) beam used to receive the corresponding PRACH are reciprocal and have a correspondence, i.e., the same spatial filtering pattern is assumed. This implies that certain UL beam directions where strong remote interference from aggressor gNBs are received have corresponding downlink (DL) beam directions which can be classified as "remote interference beam directions" although RI is of course only present in the UL.

In any regard, the gNB (e.g., base station/gNB 1002) may be aware that some beam directions are more severely impacted by RI, for instance by historic observations of Interference over Thermal levels observed in different beam directions when a ducting event occurs, or by utilizing statistical knowledge of the tropospheric ducting propagation channels. For instance, the gNB may utilize the knowledge or assumption that RI is typically received from the horizon and may thus classify beam directions pointing towards the horizon (i.e., a Zenith Angle of Arrival (ZoA)/ Zenith Angle of Departure (ZoD) of 90 degrees) as beam directions likely to be impacted by RI.

One aspect of embodiments of the present disclosure is to apply a mapping of the beam directions to SSB index for SSB transmissions such that the corresponding PRACH occasions occur at a time location where the impact of the RI associated with beam direction is minimized. That is, beam directions associated with high RI are mapped to PRACH occasions with large robustness to RI while beam directions associated with low RI are mapped to PRACH occasions with (relatively) less robustness to RI. In different embodiments of the present disclosure, this mapping can be either static or dynamic.

Figure 11:
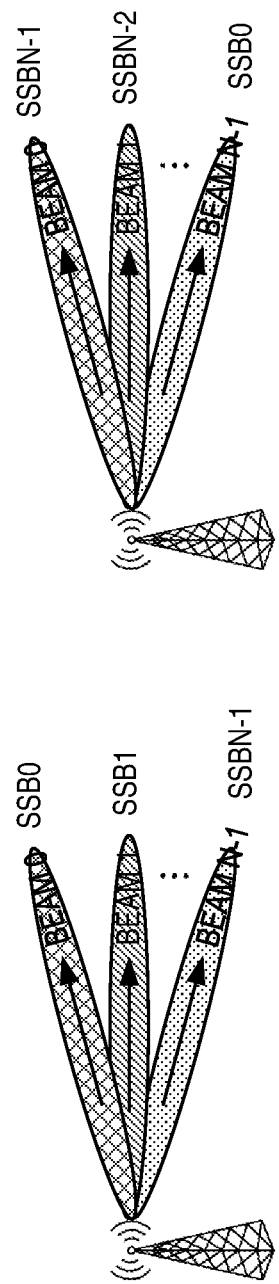
FIG. 11 illustrates two examples of different beam to SSB mappings in accordance with embodiments of the present disclosure.

For SSB transmission, there are two aspects to consider: one is the SSB beam direction and the other is the SSB index (which is used for defining the associated PRACH occasions). Therefore, when defining the associated PRACH occasions for an SSB transmission in a certain beam direction, there are also two aspects to consider. The first aspect is the SSB beam direction to SSB index mapping, which is up to the network implementation and two examples are shown in FIG. 11, where different beam to SSB index mappings are used. The second aspect is the SSB index to PRACH occasion mapping, which is defined, e.g., in specifications and an example is shown in the bottom part of FIG. 12.

In embodiments of the present disclosure, a different beam to SSB index mapping is used depending on the RI, whereas the SSB index to PRACH occasion mapping follows the rules defined in, e.g., NR Rel-15 specifications.

Figure 12:
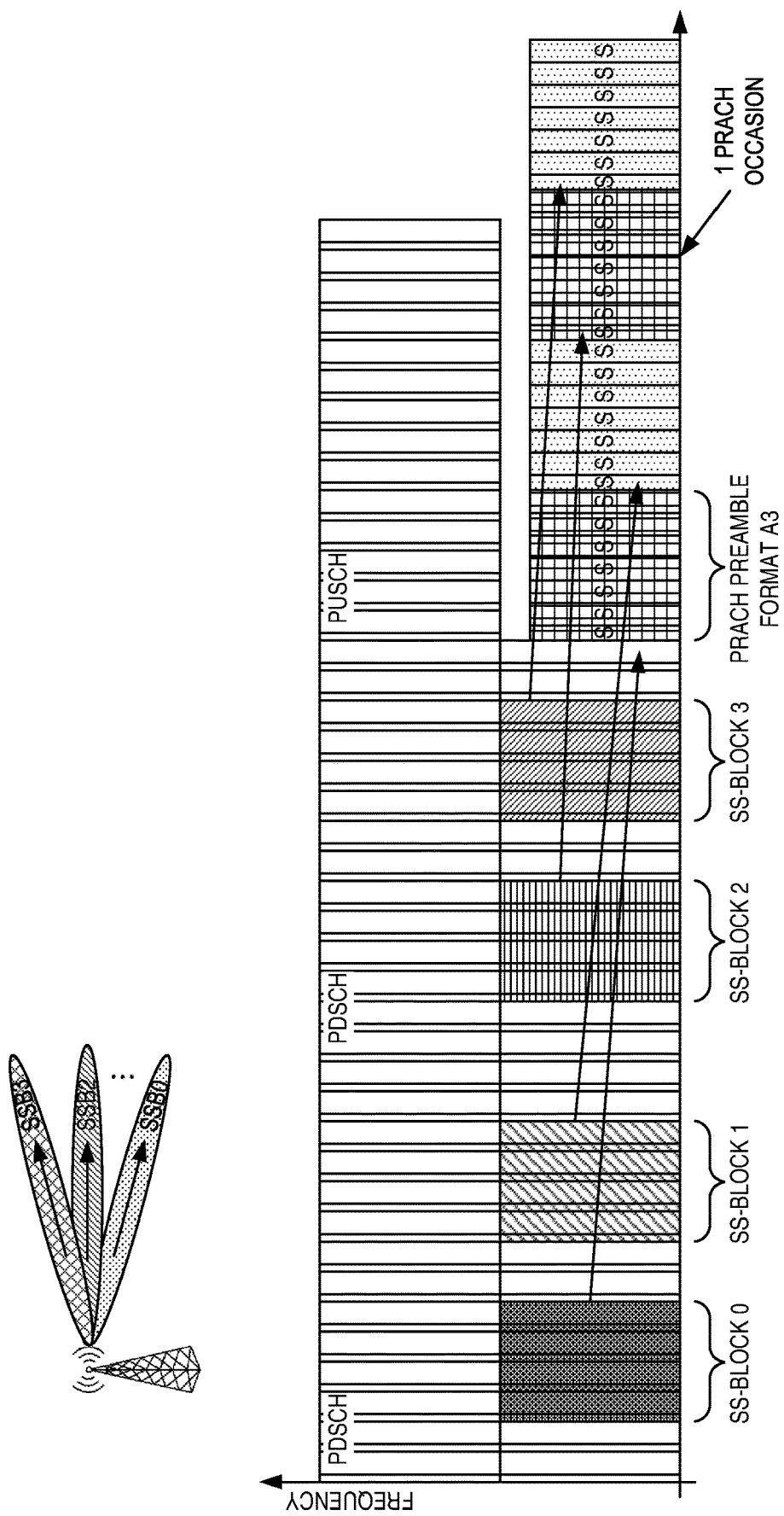
FIG. 12 illustrates an example of a mapping between beam directions and SSBs and a mapping between SSBs and PRACH occasions in accordance with embodiments of the present disclosure.

The gNB is free to arbitrarily select which Tx beam to transmit a certain SSB on and may dynamically update the beam to SSB mapping. In one embodiment, the gNB applies a static mapping of its candidate Tx beams to SSBs (i.e., to SSB indices) such that beams which are likely to experience high RI are mapped to SSBs (i.e., to SSB indices) with corresponding PRACH occasions that lie in later UL slots/ symbols. For instance, consider that a gNB is interested in beamforming a number of SSBs with a certain number of beams to maintain a certain cell coverage and let the set of beams be described by beamforming vectors $w_1, w_2, w_3, \ldots$ where it is assumed (without loss of generality) that the beams are ordered by the level of RI experienced such that $w_1$ experiences the highest level RI and $w_2$ the second highest level, and so forth. Assume also that four SSB occasions SSB0, SSB1, SSB2, SSB3 are configured as illustrated in FIG. 12. By applying embodiments of the present disclosure, the gNB statically maps the beam $w_1$ to SSB3, beam $w_2$ to SSB2, and so forth.

In another embodiment, the gNB semi-statically updates the beam to SSB mapping depending on the level of RI observed in the different beams. For instance, the gNB may continuously estimate Interference over Thermal levels for the different candidate beam directions, and thus continually update the ranking of which beams are most severely affected by RI. When the ranking has changed for the different beams, the gNB may update the beam to SSB mapping so that the currently most RI affected beams are mapped to the SSBs corresponding to the most robust PRACH occasions.

Figure 13:
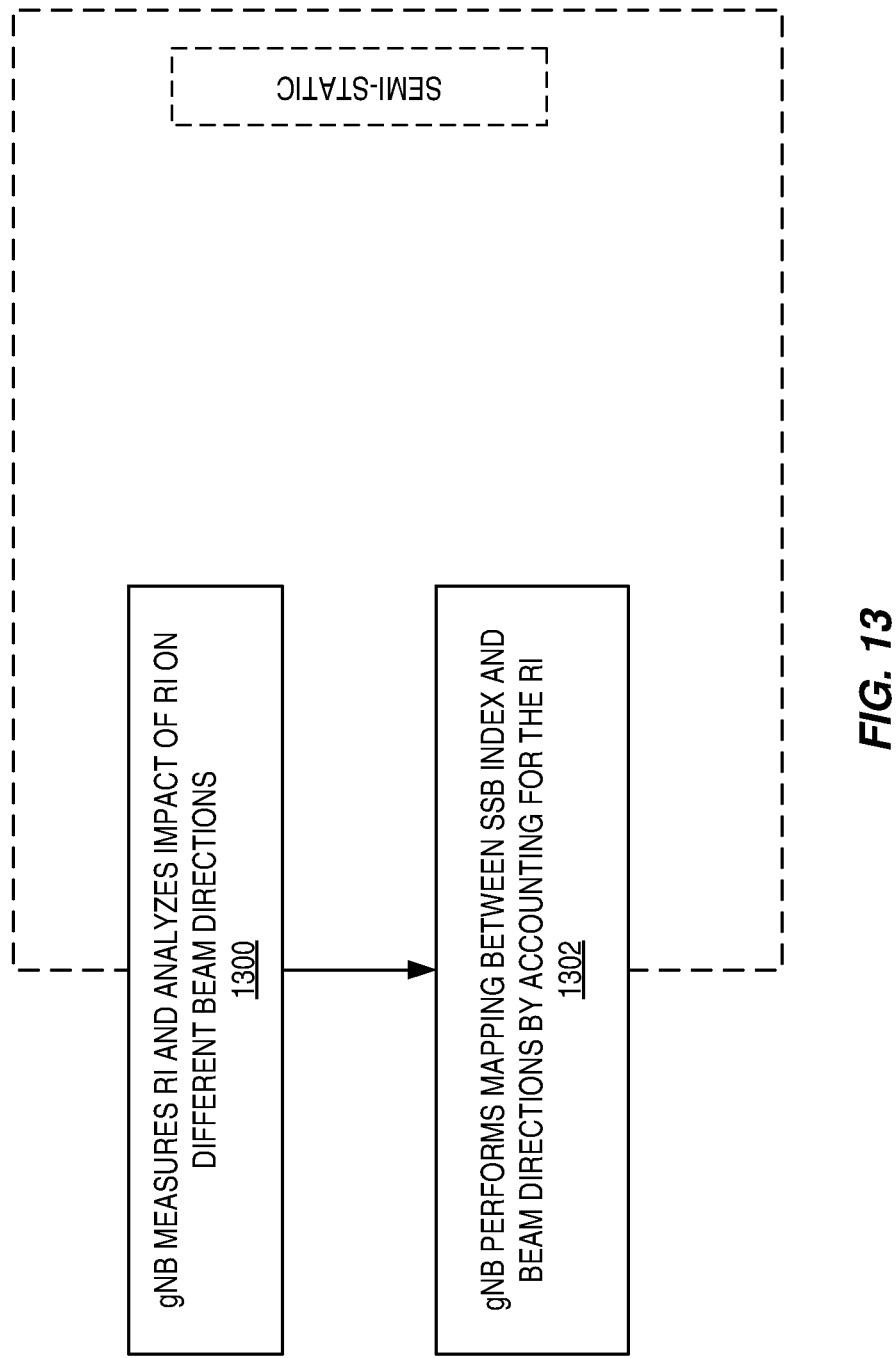
FIG. 13 is a flowchart that illustrates the operation of a base station to provide SSB to beam direction mapping in accordance with some embodiments of the present disclosure.

FIG. 13 is a flowchart that illustrates the operation of a base station (e.g., a base station 1002) in accordance with at least some aspects of the embodiments described above. In this example, the base station is a gNB, but the method is not limited thereto. As illustrated, the gNB measures RI and analyzes RI impact on different beams (step 1300). The gNB performs mapping between SSB index and beam directions based on the RI (step 1302). In other words, the gNB performs mapping between SSB index and beam directions based on the RI in accordance with any of the embodiments described above. As described above, this behavior can be semi-static or dynamic, meaning that RI can be estimated after a certain time and steps 1300 and 1302 can be repeated.

Figure 14:
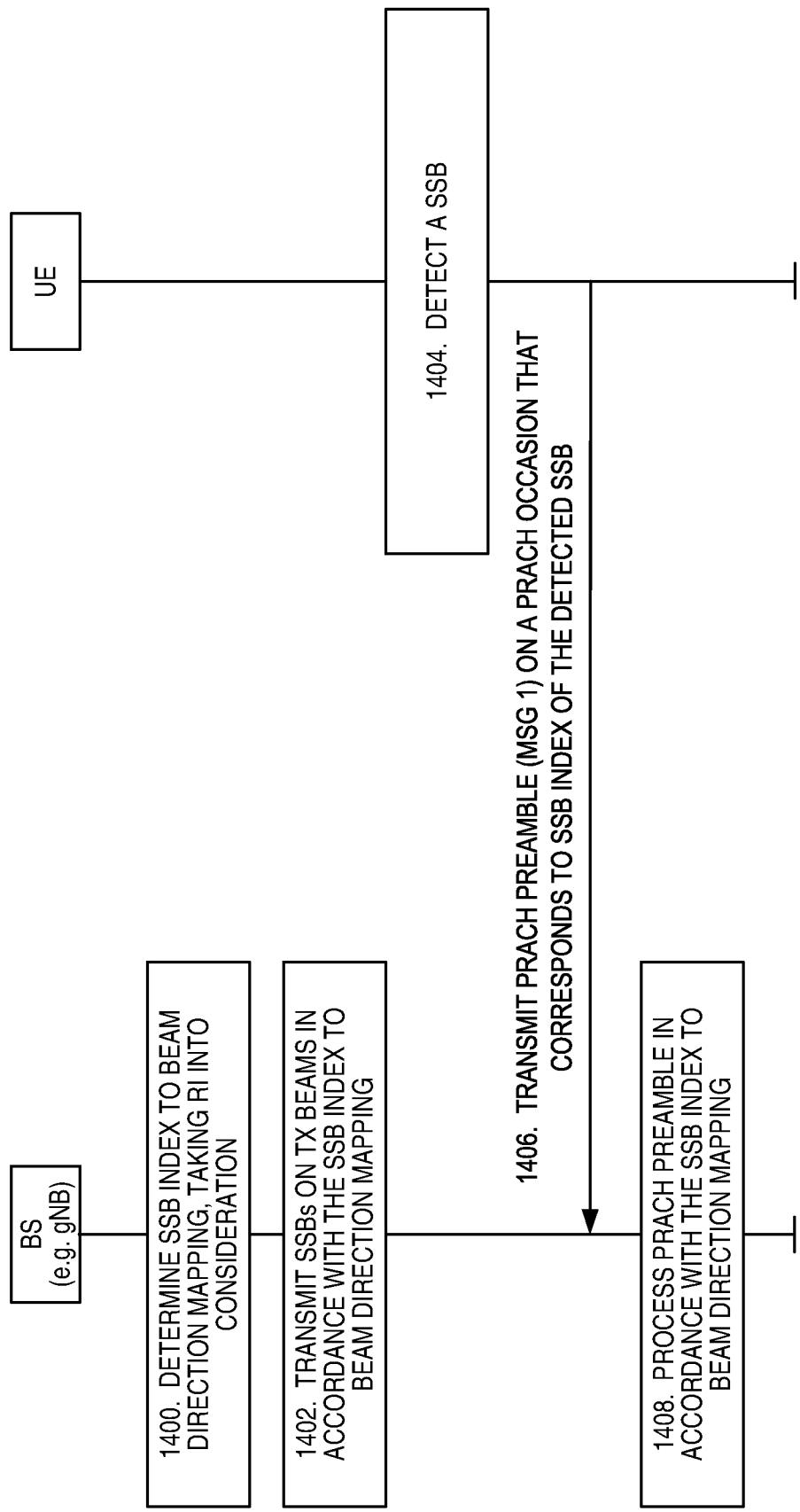
FIG. 14 illustrates the operation of a base station and a User Equipment (UE) to provide SSB to beam direction mapping in accordance with some embodiments of the present disclosure.

FIG. 14 illustrates the operation of a base station (e.g., a base station 1002, which may be a gNB) and a UE in accordance with at least some aspects of the embodiments described above. As illustrated, the base station determines a SSB index to beam direction mapping (also referred to as beam direction to SSB index mapping), taking RI into consideration, as described above (step 1400). The base station then transmits SSBs on Tx beams in accordance with the determined SSB index to beam direction mapping (step 1402). At the UE, the UE detects a SSB (step 1404) and transmits a PRACH preamble (i.e., Msg1) on a PRACH occasion that is mapped to the SSB index of the detected SSB, e.g., as defined by a standard (step 1406). The base station processes the PRACH preamble in accordance with the SSB index to beam direction mapping (step 1408). Note that the processing of the PRACH preamble also uses the SSB to PRACH occasion mapping, which for this example is assumed to be fixed, e.g., by standard.

While the gNB may dynamically update the beam direction used to transmit an SSB, it does not come without a cost. The Quasi Co-Location (QCL) relations for PDSCH and mappings to CSI-RS may be tied to a certain SSB index via a Transmission Configuration Indication (TCI) state and, if the beam to SSB mapping is updated, the currently served UEs in the cell may need to be reconfigured to start measuring other SSB indices for QCL purposes (as well as basic levels of time and frequency synchronization). This may involve heavy RRC signaling. Another issue is that UEs in the initial access procedure may perform averaging over several SSB transmission occasions of a certain SSB index, and if the beam to SSB mapping is updated, this may disrupt this process. In other words, updating the beam directions of a certain SSB may have undesirable transient effects and it is not beneficial to update this mapping too frequently.

Figure 15:
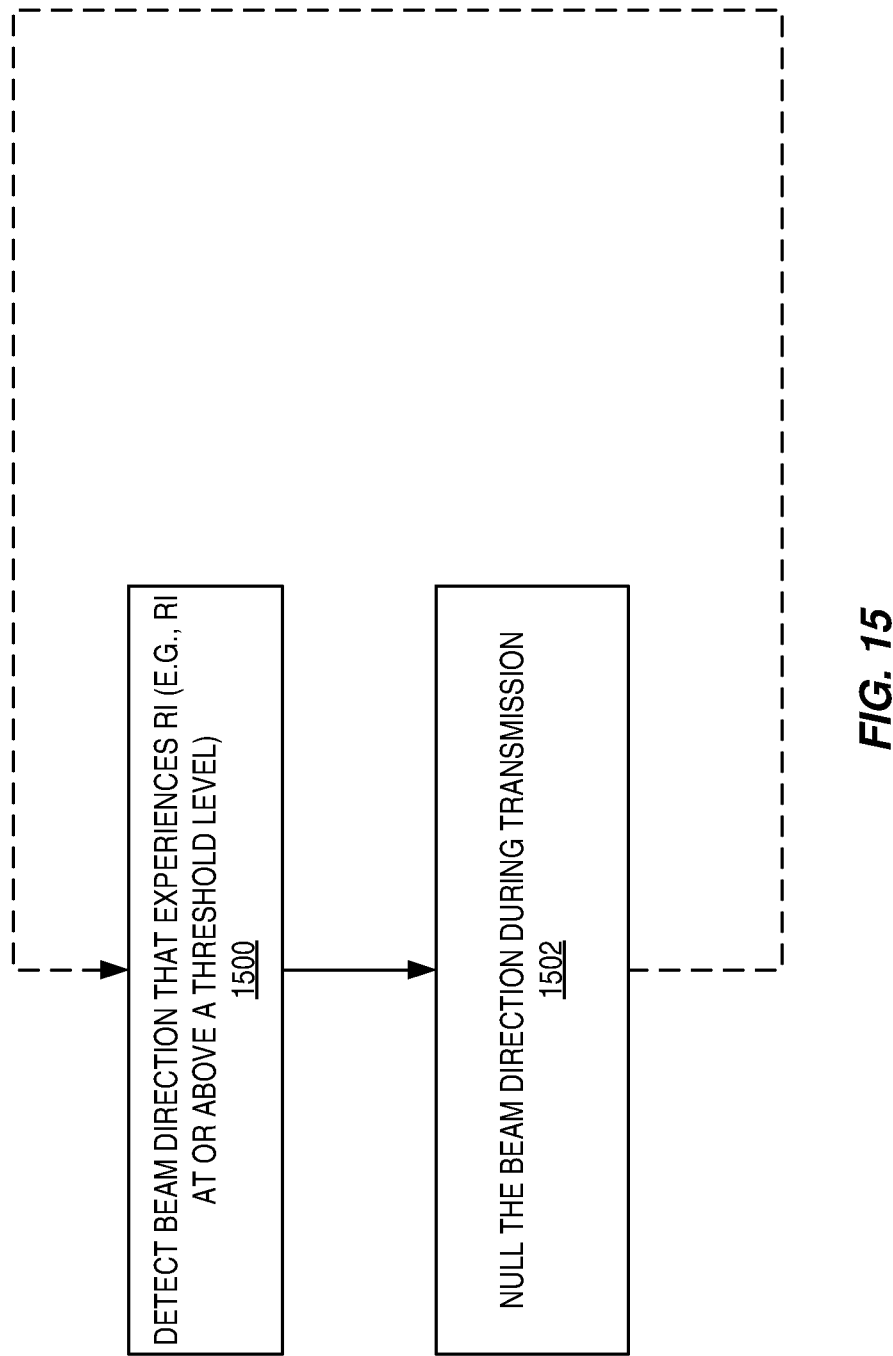
FIG. 15 is a flowchart that illustrates the operation of a base station in accordance another embodiment in which a beam direction that experiences high remote interference is nulled.

In one embodiment, there is no reordering performed. That is, there is no reordering of beam direction to SSB index mapping. Instead, the beam where remote interference is pronounced and known to impact performance is nulled. That is, no energy or little energy is transmitted in that direction and hence no UEs would be expected to use the associated PRACH occasions, or there are no valid PRACH occasions configured for the beam. FIG. 15 is a flowchart that illustrates the operation of a base station 1002 (e.g., a gNB or eNB) in accordance with this embodiment. As illustrated, the base station 1002 detects a particular beam direction that experiences RI, e.g., at or above a threshold level (step 1500). The base station 1002 nulls the particular beam direction during transmission (step 1502). For example, no energy or only a small amount of energy is transmitted in that beam direction (e.g., during transmission of SSBs).

Figure 16:
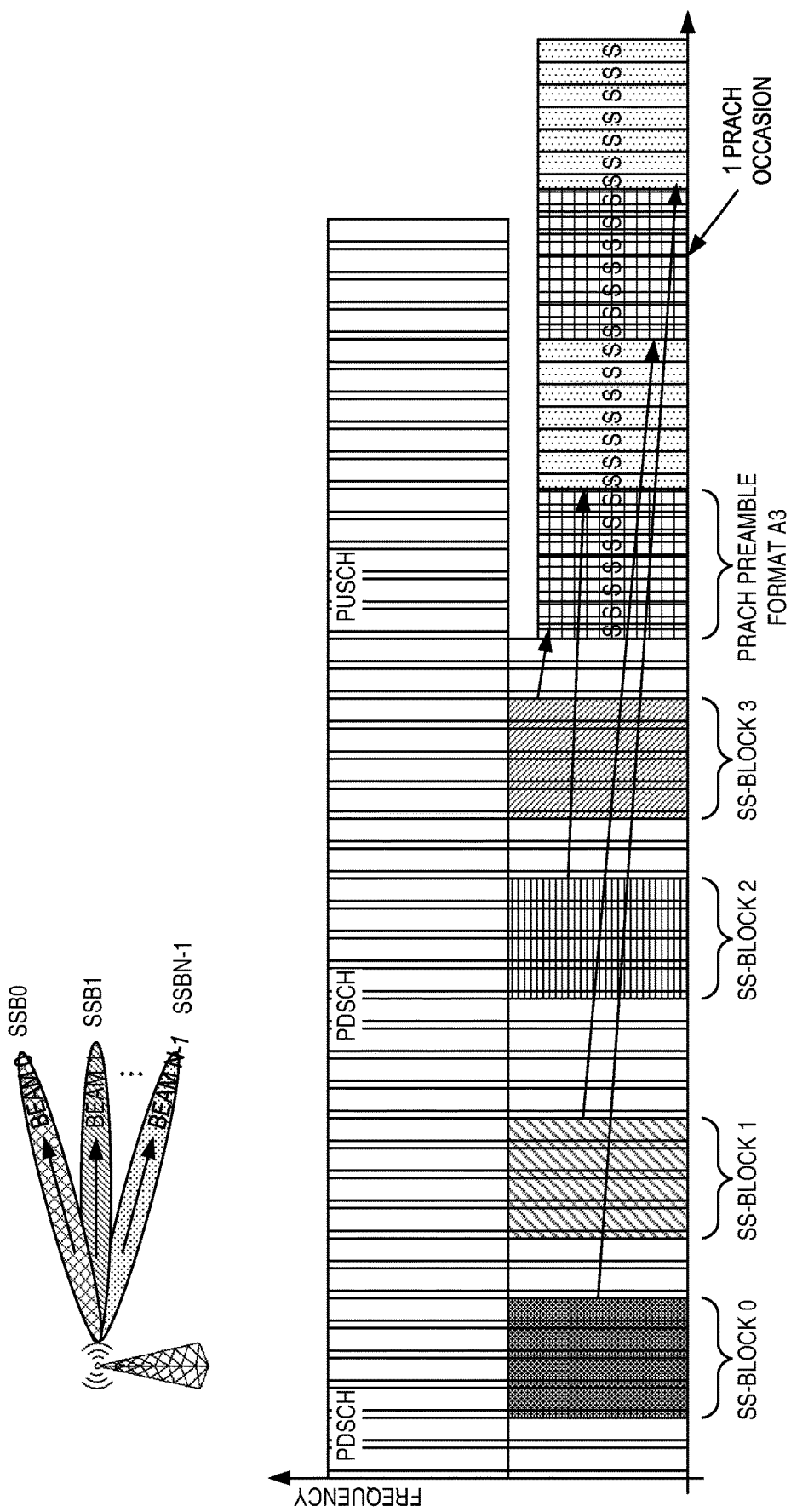
FIG. 16 is one example of SSB to PRACH occasion mapping according to another embodiment of the present disclosure.

One aspect of some other embodiments of the present disclosure is that the SSB indices are scrambled when applying the SSB index to PRACH occasion mapping rule (e.g., the SSB index to PRACH occasion mapping rule defined in NR Rel-15), so that PRACH occasions associated to the worst SSB beam (impacted due to RI) are located at the later UL symbols. For example, consider FIG. 9, assuming that the SSB beam to SSB index mapping is fixed such that an SSB beam n is mapped to SSB index n, where n=0, 1, . . . , N−1. Suppose the victim gNB knows that it is affected by the RI from an aggressor gNB in the direction of beam 0. Then instead of using the SSB index to PRACH occasion mapping according to current specifications which would have given the mapping similar to FIG. 9, through embodiments of the present disclosure, the victim gNB first reorders the SSB indices and then use these reordered indices for SSB to PRACH occasion mapping such that the PRACH occasion corresponding to SSB beam 0 is scheduled later in time, as the example shown in FIG. 16. FIG. 16 is one example of SSB to PRACH occasion mapping according to one embodiment of the present disclosure.

When defining the associated PRACH occasions for an SSB transmission in a certain beam direction, there are also two aspects to consider: The first aspect is the SSB beam direction to SSB index (top part of FIG. 9 and FIG. 16), which is up to the network implementation. The second aspect is the SSB index to PRACH occasion mapping, which is defined in specifications similar to the one in FIG. 9 and corresponding embodiments of the present disclosure on bottom part of FIG. 16. In embodiments of the present disclosure, a fixed beam to SSB index mapping is used and a different SSB index to PRACH occasion mapping is used, taking into consideration the impact of RI.

An example is illustrated in FIG. 16, where mapping of SSB to PRACH occasion was done by [3 2 1 0] instead of [0 1 2 3]. That is, SSB0 (assuming it had the correspondingly worst RI experienced) is mapped to the fourth PRACH occasion in time instead of the first PRACH occasion according to current specifications. If SSB1 is the beam that got affected the most due to RI, then PRACH occasion(s) corresponding to the SSB1 can be scheduled to the later time, then the scrambling code can be something like [3 2 0 1]. That is, scrambling is done such that beam directions associated with high RI are mapped to PRACH occasions with large robustness to RI while beam directions associated with low RI are mapped to PRACH occasions with (relatively) less robustness to RI. In different embodiments of the present disclosure, this mapping can be either static or dynamic.

In one embodiment of the present disclosure, the gNB applies a static scrambling such that beams which are likely to experience high RI are mapped to corresponding PRACH occasions that lie in later UL slots/symbols. For instance, consider that a gNB is interested in beamforming a number of SSBs with a certain number of beams to maintain a certain cell coverage and let the set of beams be described by beamforming vectors $w_1, w_2, w_3, \ldots$ where it is assumed (without loss of generality) that the beams are ordered by the level of RI experienced such that $w_1$ experiences the highest level RI and $w_2$ the second highest level, and so forth. Assume also that four SSB occasions SSB0, SSB1, SSB2, SSB3 are configured as is illustrated in FIG. 16. By applying embodiments of the present disclosure, the gNB uses the scrambling order of [3 2 1 0] assuming in this example that $w_1$ (highest RI impacted beam) corresponds to SSB0, $w_2$ corresponds to SSB1, $w_3$ to SSB2, and beam $w_4$ to SSB3 in this example of FIG. 16.

This SSB scrambling order may be dynamically or semi-statically signaled to the UE as part of the broadcast information as part of the initial access procedure. For instance, the SSB scrambling order may be conveyed in System Information Block 1 (SIB1) or the Master Information Block (MIB). Thus, instead of updating the beam to SSB mapping which may incur said undesirable transient effects, the scrambling order can be updated in SIB1 instead, which for instance avoids RRC re-configuration of TCI states.

In one embodiment, the configuration of the scrambling is explicitly given in SIB1 or MIB, e.g., by indicating one out of a predefined set of scrambling candidates. This list of scrambling candidates may, for example, be specified in a standard.

In another embodiment, the scrambling of SSB to Random Access Channel (RACH) occasion is changing between each SSB burst set with a predefined rule. Then, the SIB1 or MIB only need to indicate if, e.g., Rel-15 mapping between SSB and RACH occasion should be used or the proposed time varying SSB to RACH occasion mapping should be used. The mapping from SSB to RACH occasion can, e.g., be based on "bit reversed" order. Using a bit reversed order in every second SSB burst set and not bit reversed order in the remaining SSB burst sets would be very implementation friendly mapping.

In one embodiment, another frequency allocation for RO for UEs beyond Release 16 (Rel-16) is introduced so that a gNB can from the frequency allocation that the RO are sent, decode which Release the UE is and apply corresponding de-mapping rule.

In one embodiment, there is no scrambling performed, instead the beam where remote interference is pronounced and known to impact performance is nulled. That is no/little energy is transmitted in that direction and hence no UEs would be expected to use the associated PRACH occasions, or there are no valid PRACH occasions configured for the beam.

Figure 17:
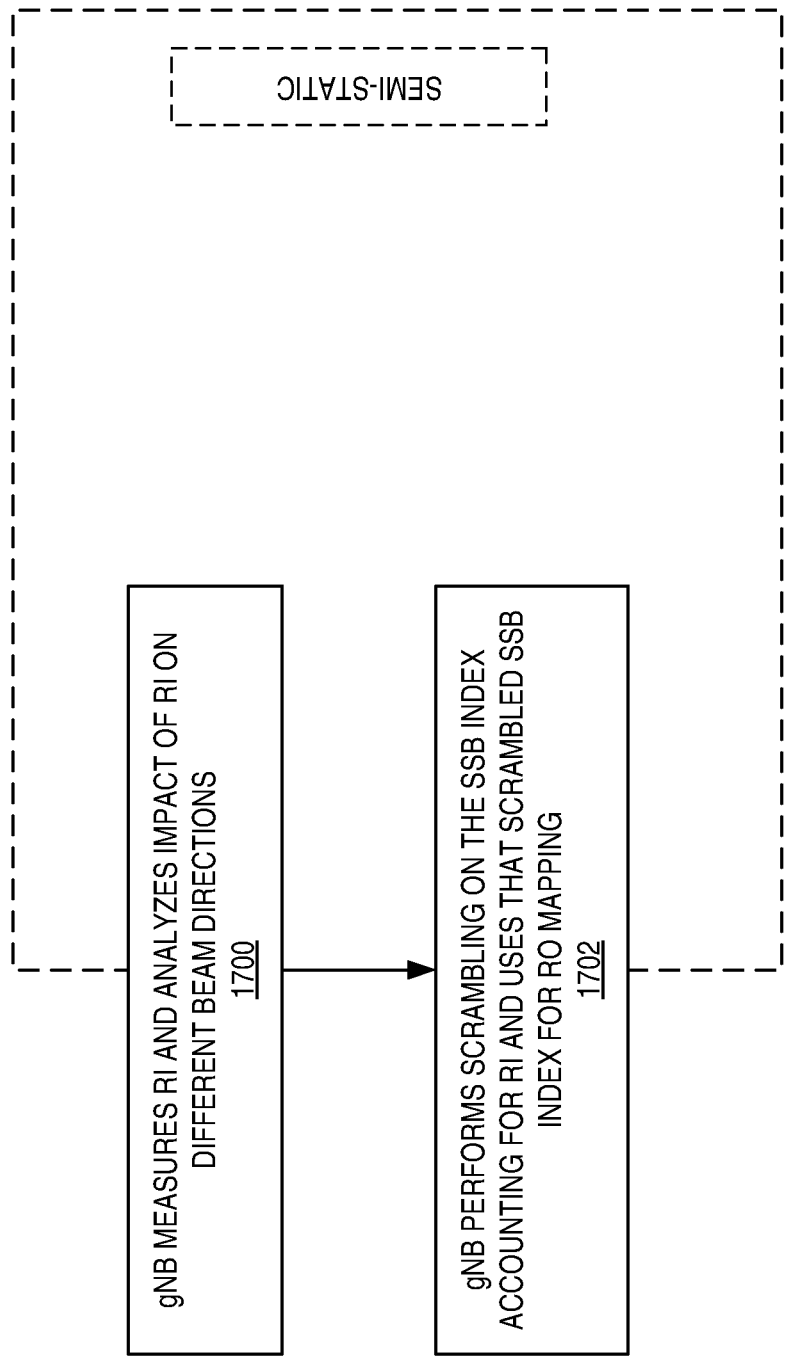
FIG. 17 is a flowchart that illustrates the operation of a base station to provide SSB to beam direction mapping in accordance with some embodiments of the present disclosure.

FIG. 17 is a flowchart that illustrates the operation of a base station (e.g., a base station 1002) in accordance with at least some aspects of the embodiments described above. In this example, the base station is a gNB, but the illustrated method is not limited thereto. As illustrated, the gNB measures RI and analyzes RI impact on different beams (step 1700). The gNB performs scrambling on the SSB index accounting for RI and uses that scrambled SSB index for RO mapping (step 1702). In other words, the gNB performs scrambling on the SSB index account for RI and uses that scrambled SSB index for RO mapping in accordance with any of the embodiments described above. As described above, this behavior can be semi-static or dynamic, meaning that RI can be estimated after a certain time and the steps 1700 and 1702 can be repeated.

Figure 18:
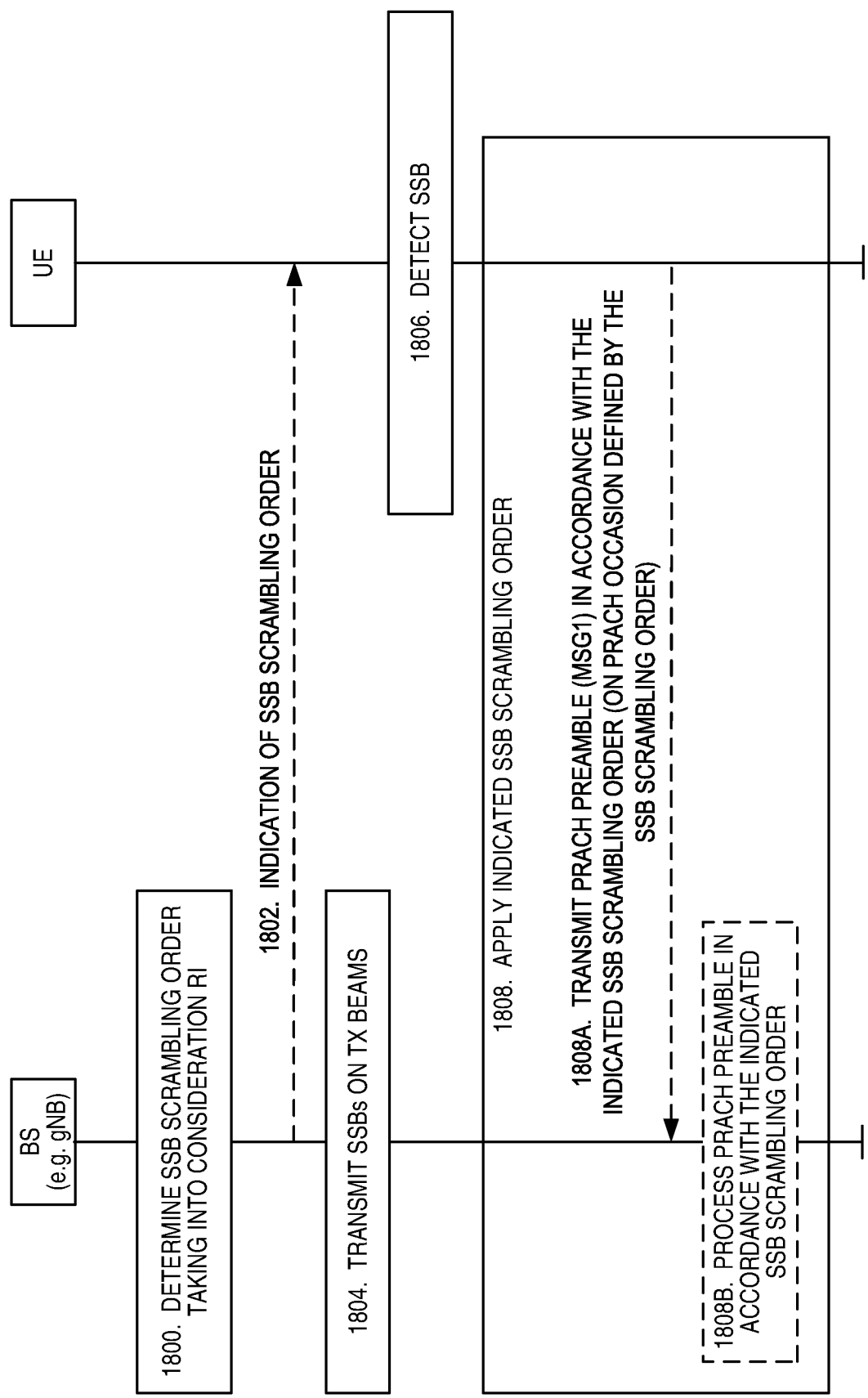
FIG. 18 illustrates the operation of a base station and a UE to provide SSB to beam direction mapping in accordance with some embodiments of the present disclosure.

FIG. 18 illustrates the operation of a base station (e.g., a base station 1002, which may be a gNB) and a UE in accordance with at least some aspects of the embodiments described above. Optional steps are represented by dashed lines. As illustrated, the base station determines a SSB scrambling order taking into consideration RI, as described above (step 1800). Optionally, the base station signals an indication of the determined SSB scrambling order to the UE, as described above (step 1802). The base station then transmits SSBs on Tx beams in accordance with a defined SSB index to beam direction mapping (step 1804). At the UE, the UE detects a SSB (step 1806). The base station and the UE then apply the indicated SSB scrambling order when determining SSB to PRACH occasion mappings (step 1808). For example, the UE transmits a PRACH preamble (i.e., Msg1) in accordance with the indicated SSB scrambling order (step 1808A). In other words, the UE transmits the PRACH preamble (i.e., Msg1) on the PRACH occasion defined by the SSB scrambling order (e.g., and a predefined rule or table that maps the sequence of SSB indices in the SSB scrambling order to respective PRACH occasions). The base station processes the PRACH preamble in accordance with the indicated SSB scrambling order (step 1808B).

Figure 19:
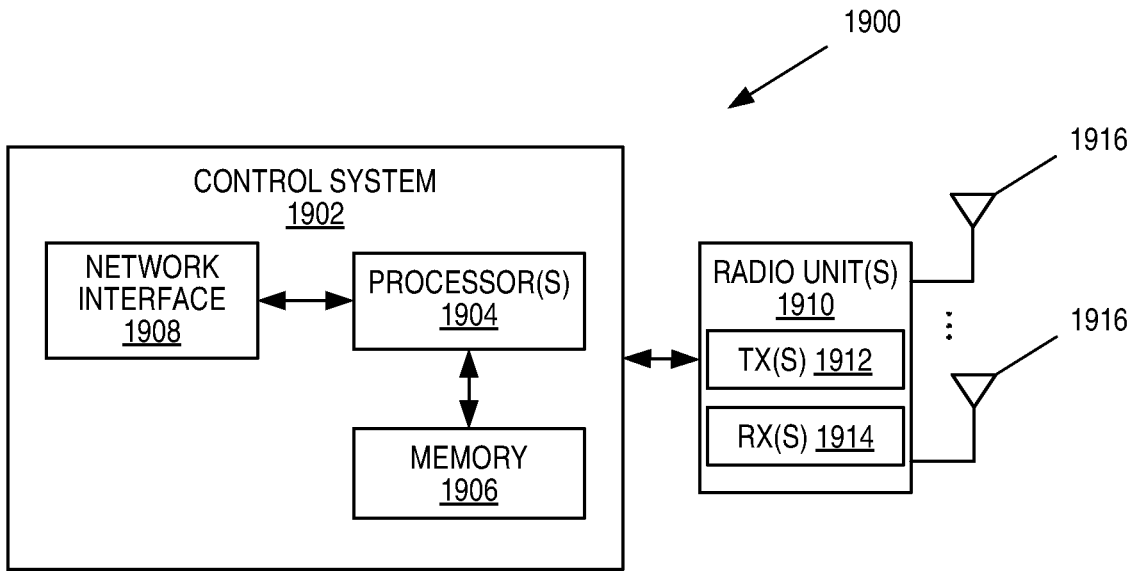
FIGS. 19 through 21 illustrate example embodiments of a radio access node (e.g., a base station)

FIG. 19 is a schematic block diagram of a radio access node 1900 according to some embodiments of the present disclosure. The radio access node 1900 may be, for example, a base station 1002 or 1006. As illustrated, the radio access node 1900 includes a control system 1902 that includes one or more processors 1904 (e.g., Central Processing Units (CPUs), Application Specific Integrated Circuits (ASICs), Field Programmable Gate Arrays (FPGAs), and/or the like), memory 1906, and a network interface 1908. The one or more processors 1904 are also referred to herein as processing circuitry. In addition, the radio access node 1900 includes one or more radio units 1910 that each includes one or more transmitters 1912 and one or more receivers 1914 coupled to one or more antennas 1916. The radio units 1910 may be referred to or be part of radio interface circuitry. In some embodiments, the radio unit(s) 1910 is external to the control system 1902 and connected to the control system 1902 via, e.g., a wired connection (e.g., an optical cable). However, in some other embodiments, the radio unit(s) 1910 and potentially the antenna(s) 1916 are integrated together with the control system 1902. The one or more processors 1904 operate to provide one or more functions of a radio access node 1900 as described herein (e.g., one or more functions of the base station 1002 (e.g., gNB) as described above, e.g., with respect to any of FIGS. 11 through 17). In some embodiments, the function(s) are implemented in software that is stored, e.g., in the memory 1906 and executed by the one or more processors 1904.

Figure 20:
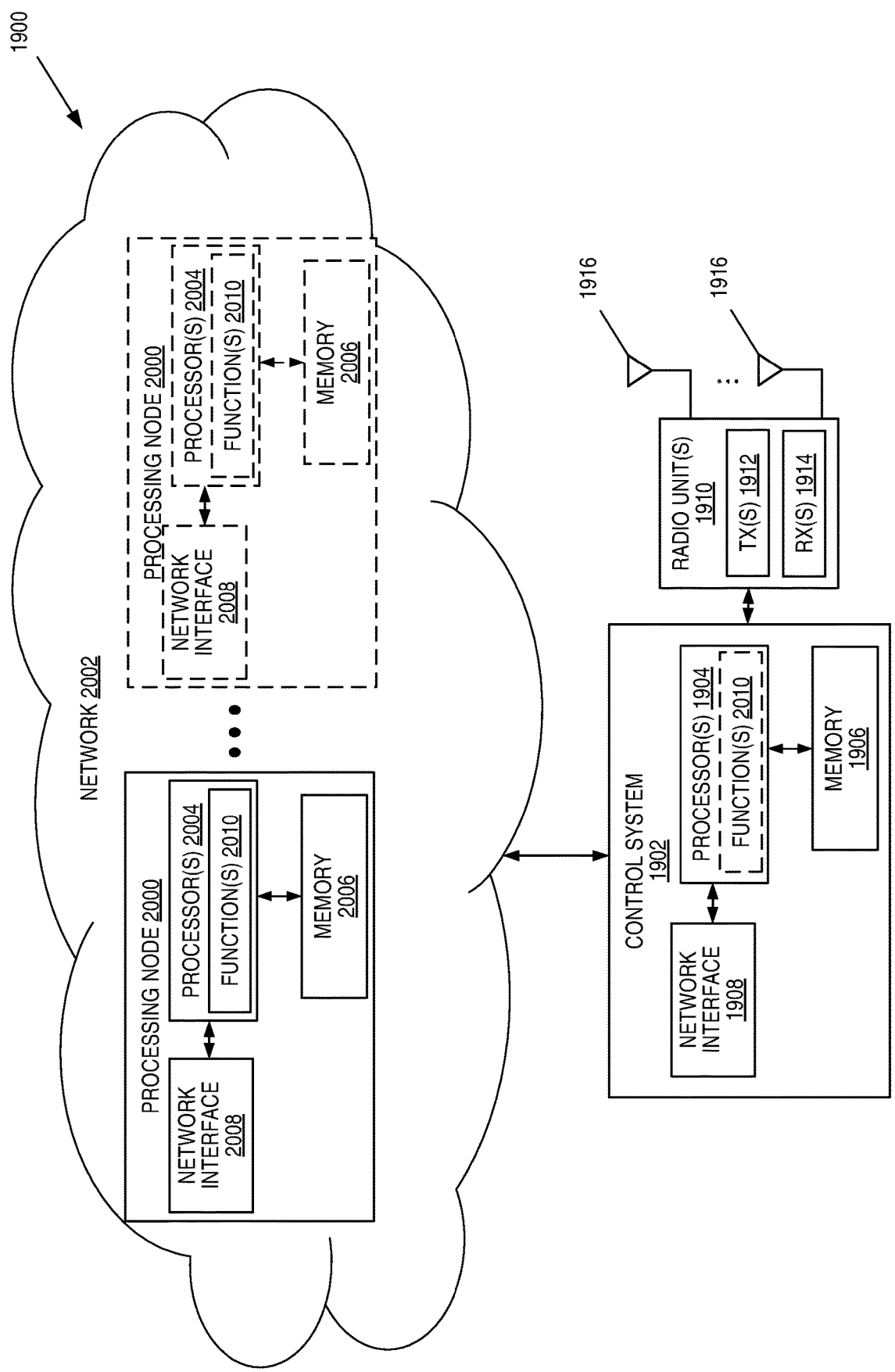

FIG. 20 is a schematic block diagram that illustrates a virtualized embodiment of the radio access node 1900 according to some embodiments of the present disclosure. This discussion is equally applicable to other types of network nodes. Further, other types of network nodes may have similar virtualized architectures.

As used herein, a "virtualized" radio access node is an implementation of the radio access node 1900 in which at least a portion of the functionality of the radio access node 1900 is implemented as a virtual component(s) (e.g., via a virtual machine(s) executing on a physical processing node(s) in a network(s)). As illustrated, in this example, the radio access node 1900 includes the control system 1902 that includes the one or more processors 1904 (e.g., CPUs, ASICs, FPGAs, and/or the like), the memory 1906, and the network interface 1908 and the one or more radio units 1910 that each includes the one or more transmitters 1912 and the one or more receivers 1914 coupled to the one or more antennas 1916, as described above. The control system 1902 is connected to the radio unit(s) 1910 via, for example, an optical cable or the like. The control system 1902 is connected to one or more processing nodes 2000 coupled to or included as part of a network(s) 2002 via the network interface 1908. Each processing node 2000 includes one or more processors 2004 (e.g., CPUs, ASICs, FPGAs, and/or the like), memory 2006, and a network interface 2008.

In this example, functions 2010 of the radio access node 1900 described herein (e.g., one or more functions of the base station 1002 (e.g., gNB) as descried above, e.g., with respect to any of FIGS. 11 through 17) are implemented at the one or more processing nodes 2000 or distributed across the control system 1902 and the one or more processing nodes 2000 in any desired manner. In some particular embodiments, some or all of the functions 2010 of the radio access node 1900 described herein are implemented as virtual components executed by one or more virtual machines implemented in a virtual environment(s) hosted by the processing node(s) 2000. As will be appreciated by one of ordinary skill in the art, additional signaling or communication between the processing node(s) 2000 and the control system 1902 is used in order to carry out at least some of the desired functions 2010. Notably, in some embodiments, the control system 1902 may not be included, in which case the radio unit(s) 1910 communicate directly with the processing node(s) 2000 via an appropriate network interface(s).

In some embodiments, a computer program including instructions which, when executed by at least one processor, causes the at least one processor to carry out the functionality of radio access node 1900 or a node (e.g., a processing node 2000) implementing one or more of the functions 2010 of the radio access node 1900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
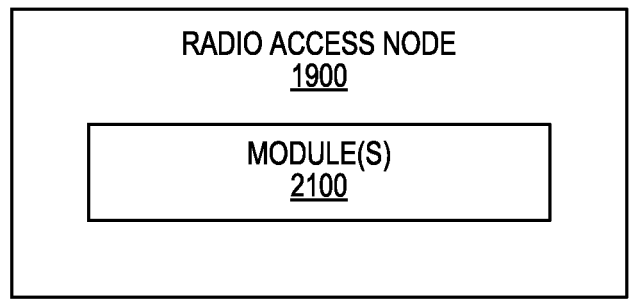

FIG. 21 is a schematic block diagram of the radio access node 1900 according to some other embodiments of the present disclosure. The radio access node 1900 includes one or more modules 2100, each of which is implemented in software. The module(s) 2100 provide the functionality of the radio access node 1900 (e.g., one or more functions of the base station 1002 (e.g., gNB) as described above, e.g., with respect to any of FIGS. 11 through 17) described herein. This discussion is equally applicable to the processing node 2000 of FIG. 20 where the modules 2100 may be implemented at one of the processing nodes 2000 or distributed across multiple processing nodes 2000 and/or distributed across the processing node(s) 2000 and the control system 1902.

Figure 22:
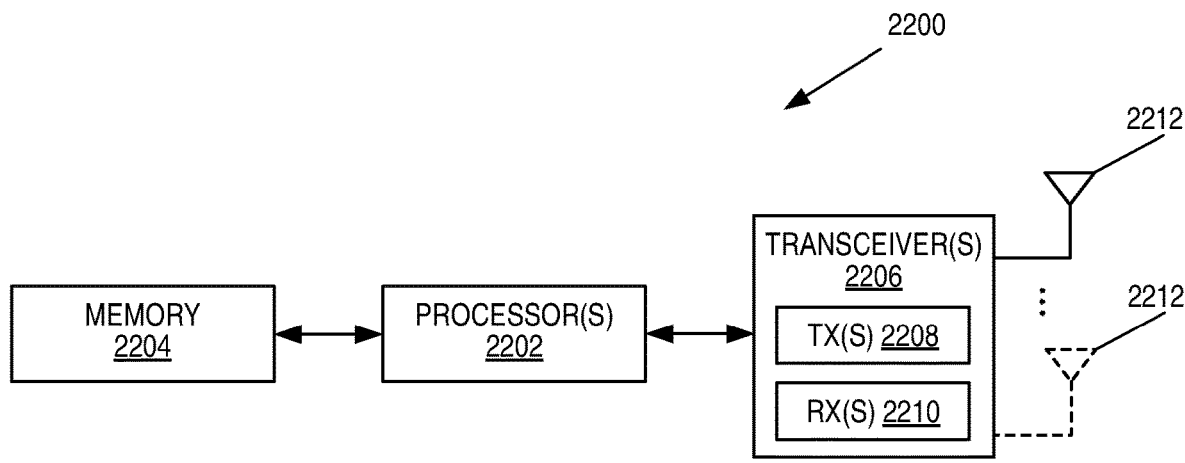
FIGS. 22 and 23 illustrate example embodiments of a UE.

FIG. 22 is a schematic block diagram of a UE 2200 according to some embodiments of the present disclosure. As illustrated, the UE 2200 includes one or more processors 2202 (e.g., CPUs, ASICs, FPGAs, and/or the like), memory 2204, and one or more transceivers 2206 each including one or more transmitters 2208 and one or more receivers 2210 coupled to one or more antennas 2212. The transceiver(s) 2206 includes radio-front end circuitry connected to the antenna(s) 2212 that is configured to condition signals communicated between the antenna(s) 2212 and the processor(s) 2202, as will be appreciated by on of ordinary skill in the art. The processors 2202 are also referred to herein as processing circuitry. The transceivers 2206 are also referred to herein as radio circuitry. In some embodiments, the functionality of the UE 2200 described above (e.g., one or more functions of the UE 1012 as described above, e.g., with respect to any of FIGS. 11 through 17) may be fully or partially implemented in software that is, e.g., stored in the memory 2204 and executed by the processor(s) 2202. Note that the UE 2200 may include additional components not illustrated in FIG. 22 such as, e.g., one or more user interface components (e.g., an input/output interface including a display, buttons, a touch screen, a microphone, a speaker(s), and/or the like and/or any other components for allowing input of information into the UE 2200 and/or allowing output of information from the UE 2200), a power supply (e.g., a battery and associated power circuitry), etc.

In some embodiments, a computer program including instructions which, when executed by at least one processor, causes the at least one processor to carry out the functionality of the UE 2200 according to any of the embodiments described herein (e.g., one or more functions of the UE 1012 as described above, e.g., with respect to any of FIGS. 11 through 17) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
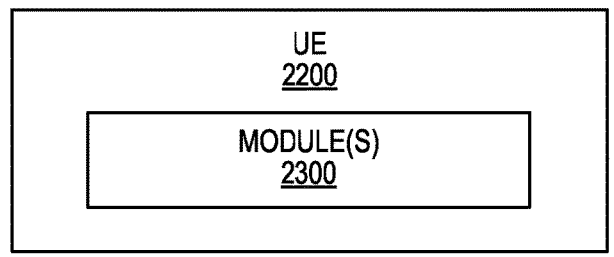

FIG. 23 is a schematic block diagram of the UE 2200 according to some other embodiments of the present disclosure. The UE 2200 includes one or more modules 2300, each of which is implemented in software. The module(s) 2300 provide the functionality of the UE 2200 described herein.

Figure 24:
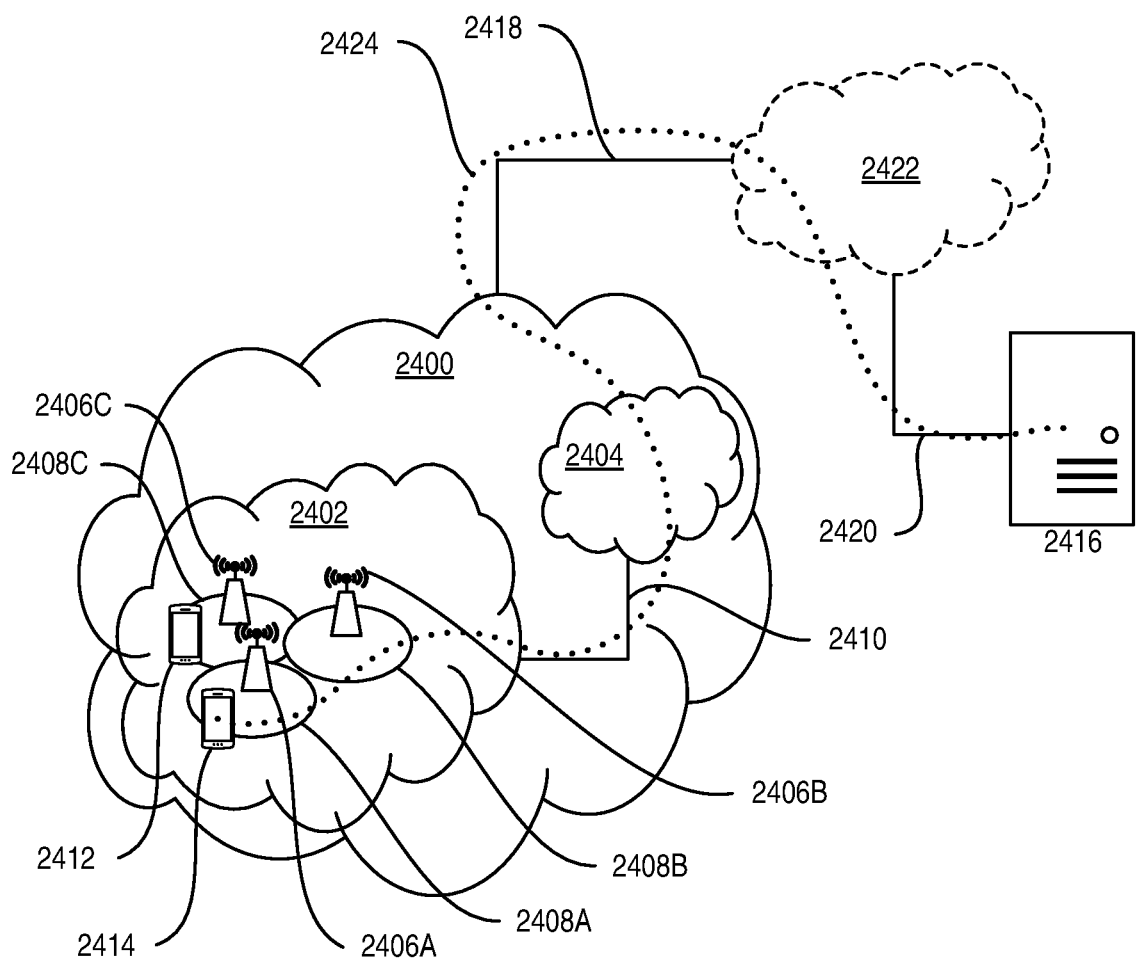
FIG. 24 illustrates a telecommunication network connected via an intermediate network to a host computer in accordance with some embodiments of the present disclosure.

With reference to FIG. 24, in accordance with an embodiment, a communication system includes a telecommunication network 2400, such as a 3GPP-type cellular network, which comprises an access network 2402, such as a Radio Access Network (RAN), and a core network 2404. The access network 2402 comprises a plurality of base stations 2406A, 2406B, 2406C, such as Node Bs, eNBs, gNBs, or other types of wireless APs, each defining a corresponding coverage area 2408A, 2408B, 2408C. Each base station 2406A, 2406B, 2406C is connectable to the core network 2404 over a wired or wireless connection 2410. A first UE 2412 located in coverage area 2408C is configured to wirelessly connect to, or be paged by, the corresponding base station 2406C. A second UE 2414 in coverage area 2408A is wirelessly connectable to the corresponding base station 2406A. While a plurality of UEs 2412, 2414 are illustrated in this example, the disclosed embodiments are equally applicable to a situation where a sole UE is in the coverage area or where a sole UE is connecting to the corresponding base station 2406.

The telecommunication network 2400 is itself connected to a host computer 2416, which may be embodied in the hardware and/or software of a standalone server, a cloud-implemented server, a distributed server, or as processing resources in a server farm. The host computer 2416 may be under the ownership or control of a service provider, or may be operated by the service provider or on behalf of the service provider. Connections 2418 and 2420 between the telecommunication network 2400 and the host computer 2416 may extend directly from the core network 2404 to the host computer 2416 or may go via an optional intermediate network 2422. The intermediate network 2422 may be one of, or a combination of more than one of, a public, private, or hosted network; the intermediate network 2422, if any, may be a backbone network or the Internet; in particular, the intermediate network 2422 may comprise two or more sub-networks (not shown).

The communication system of FIG. 24 as a whole enables connectivity between the connected UEs 2412, 2414 and the host computer 2416. The connectivity may be described as an Over-the-Top (OTT) connection 2424. The host computer 2416 and the connected UEs 2412, 2414 are configured to communicate data and/or signaling via the OTT connection 2424, using the access network 2402, the core network 2404, any intermediate network 2422, and possible further infrastructure (not shown) as intermediaries. The OTT connection 2424 may be transparent in the sense that the participating communication devices through which the OTT connection 2424 passes are unaware of routing of uplink and downlink communications. For example, the base station 2406 may not or need not be informed about the past routing of an incoming downlink communication with data originating from the host computer 2416 to be forwarded (e.g., handed over) to a connected UE 2412. Similarly, the base station 2406 need not be aware of the future routing of an outgoing uplink communication originating from the UE 2412 towards the host computer 2416.

Example implementations, in accordance with an embodiment, of the UE, base station, and host computer discussed in the preceding paragraphs will now be described with reference to FIG. 25. In a communication system 2500, a host computer 2502 comprises hardware 2504 including a communication interface 2506 configured to set up and maintain a wired or wireless connection with an interface of a different communication device of the communication system 2500. The host computer 2502 further comprises processing circuitry 2508, which may have storage and/or processing capabilities. In particular, the processing circuitry 2508 may comprise one or more programmable processors, ASICs, FPGAs, or combinations of these (not shown) adapted to execute instructions. The host computer 2502 further comprises software 2510, which is stored in or accessible by the host computer 2502 and executable by the processing circuitry 2508. The software 2510 includes a host application 2512. The host application 2512 may be operable to provide a service to a remote user, such as a UE 2514 connecting via an OTT connection 2516 terminating at the UE 2514 and the host computer 2502. In providing the service to the remote user, the host application 2512 may provide user data which is transmitted using the OTT connection 2516.

The communication system 2500 further includes a base station 2518 provided in a telecommunication system and comprising hardware 2520 enabling it to communicate with the host computer 2502 and with the UE 2514. The hardware 2520 may include a communication interface 2522 for setting up and maintaining a wired or wireless connection with an interface of a different communication device of the communication system 2500, as well as a radio interface 2524 for setting up and maintaining at least a wireless connection 2526 with the UE 2514 located in a coverage area (not shown in FIG. 25) served by the base station 2518. The communication interface 2522 may be configured to facilitate a connection 2528 to the host computer 2502. The connection 2528 may be direct or it may pass through a core network (not shown in FIG. 25) of the telecommunication system and/or through one or more intermediate networks outside the telecommunication system. In the embodiment shown, the hardware 2520 of the base station 2518 further includes processing circuitry 2530, which may comprise one or more programmable processors, ASICs, FPGAs, or combinations of these (not shown) adapted to execute instructions. The base station 2518 further has software 2532 stored internally or accessible via an external connection.

The communication system 2500 further includes the UE 2514 already referred to. The UE's 2514 hardware 2534 may include a radio interface 2536 configured to set up and maintain a wireless connection 2526 with a base station serving a coverage area in which the UE 2514 is currently located. The hardware 2534 of the UE 2514 further includes processing circuitry 2538, which may comprise one or more programmable processors, ASICs, FPGAs, or combinations of these (not shown) adapted to execute instructions. The UE 2514 further comprises software 2540, which is stored in or accessible by the UE 2514 and executable by the processing circuitry 2538. The software 2540 includes a client application 2542. The client application 2542 may be operable to provide a service to a human or non-human user via the UE 2514, with the support of the host computer 2502. In the host computer 2502, the executing host application 2512 may communicate with the executing client application 2542 via the OTT connection 2516 terminating at the UE 2514 and the host computer 2502. In providing the service to the user, the client application 2542 may receive request data from the host application 2512 and provide user data in response to the request data. The OTT connection 2516 may transfer both the request data and the user data. The client application 2542 may interact with the user to generate the user data that it provides.

Figure 25:
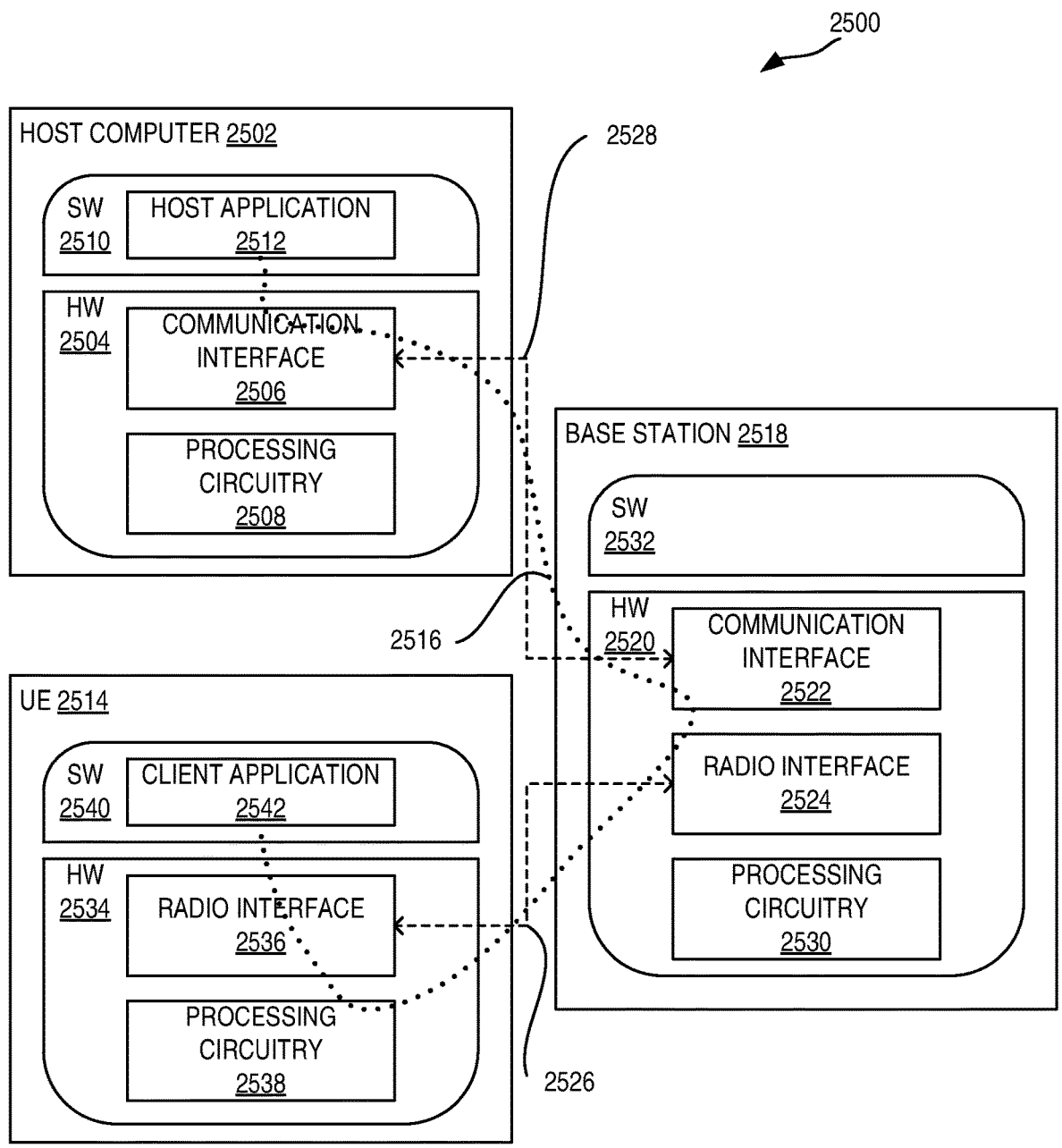
FIG. 25 is a generalized block diagram of a host computer communicating via a base station with a UE over a partially wireless connection in accordance with some embodiments of the present disclosure.

It is noted that the host computer 2502, the base station 2518, and the UE 2514 illustrated in FIG. 25 may be similar or identical to the host computer 2416, one of the base stations 2406A, 2406B, 2406C, and one of the UEs 2412, 2414 of FIG. 24, respectively. This is to say, the inner workings of these entities may be as shown in FIG. 25 and independently, the surrounding network topology may be that of FIG. 24.

In FIG. 25, the OTT connection 2516 has been drawn abstractly to illustrate the communication between the host computer 2502 and the UE 2514 via the base station 2518 without explicit reference to any intermediary devices and the precise routing of messages via these devices. The network infrastructure may determine the routing, which may be configured to hide from the UE 2514 or from the service provider operating the host computer 2502, or both. While the OTT connection 2516 is active, the network infrastructure may further take decisions by which it dynamically changes the routing (e.g., on the basis of load balancing consideration or reconfiguration of the network).

The wireless connection 2526 between the UE 2514 and the base station 2518 is in accordance with the teachings of the embodiments described throughout this disclosure. One or more of the various embodiments improve the performance of OTT services provided to the UE 2514 using the OTT connection 2516, in which the wireless connection 2526 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 2516 between the host computer 2502 and the UE 2514, in response to variations in the measurement results. The measurement procedure and/or the network functionality for reconfiguring the OTT connection 2516 may be implemented in the software 2510 and the hardware 2504 of the host computer 2502 or in the software 2540 and the hardware 2534 of the UE 2514, or both. In some embodiments, sensors (not shown) may be deployed in or in association with communication devices through which the OTT connection 2516 passes; the sensors may participate in the measurement procedure by supplying values of the monitored quantities exemplified above, or supplying values of other physical quantities from which the software 2510, 2540 may compute or estimate the monitored quantities. The reconfiguring of the OTT connection 2516 may include message format, retransmission settings, preferred routing, etc.; the reconfiguring need not affect the base station 2518, and it may be unknown or imperceptible to the base station 2518. Such procedures and functionalities may be known and practiced in the art. In certain embodiments, measurements may involve proprietary UE signaling facilitating the host computer 2502's measurements of throughput, propagation times, latency, and the like. The measurements may be implemented in that the software 2510 and 2540 causes messages to be transmitted, in particular empty or 'dummy' messages, using the OTT connection 2516 while it monitors propagation times, errors, etc.

Figures 26, 27:
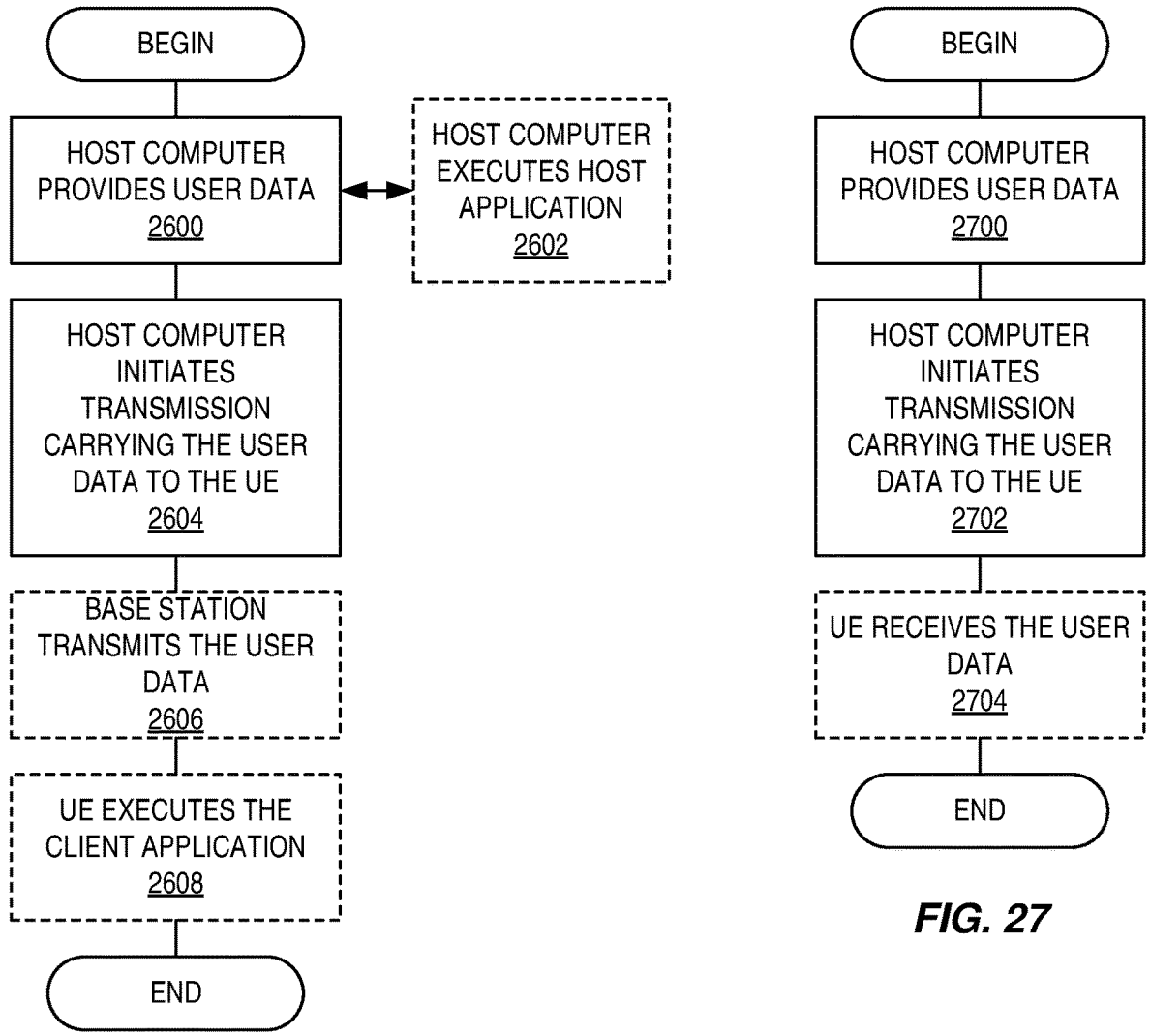
FIG. 26 is a flowchart illustrating a method implemented in a communication system in accordance with one embodiment of the present disclosure.
FIG. 27 is a flowchart illustrating a method implemented in a communication system in accordance with one embodiment of the present disclosure.

FIG. 26 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 26 will be included in this section. In step 2600, the host computer provides user data. In sub-step 2602 (which may be optional) of step 2600, the host computer provides the user data by executing a host application. In step 2604, the host computer initiates a transmission carrying the user data to the UE. In step 2606 (which may be optional), the base station transmits to the UE the user data which was carried in the transmission that the host computer initiated, in accordance with the teachings of the embodiments described throughout this disclosure. In step 2608 (which may also be optional), the UE executes a client application associated with the host application executed by the host computer.

FIG. 27 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 27 will be included in this section. In step 2700 of the method, the host computer provides user data. In an optional sub-step (not shown) the host computer provides the user data by executing a host application. In step 2702, the host computer initiates a transmission carrying the user data to the UE. The transmission may pass via the base station, in accordance with the teachings of the embodiments described throughout this disclosure. In step 2704 (which may be optional), the UE receives the user data carried in the transmission.

Figures 28, 29:
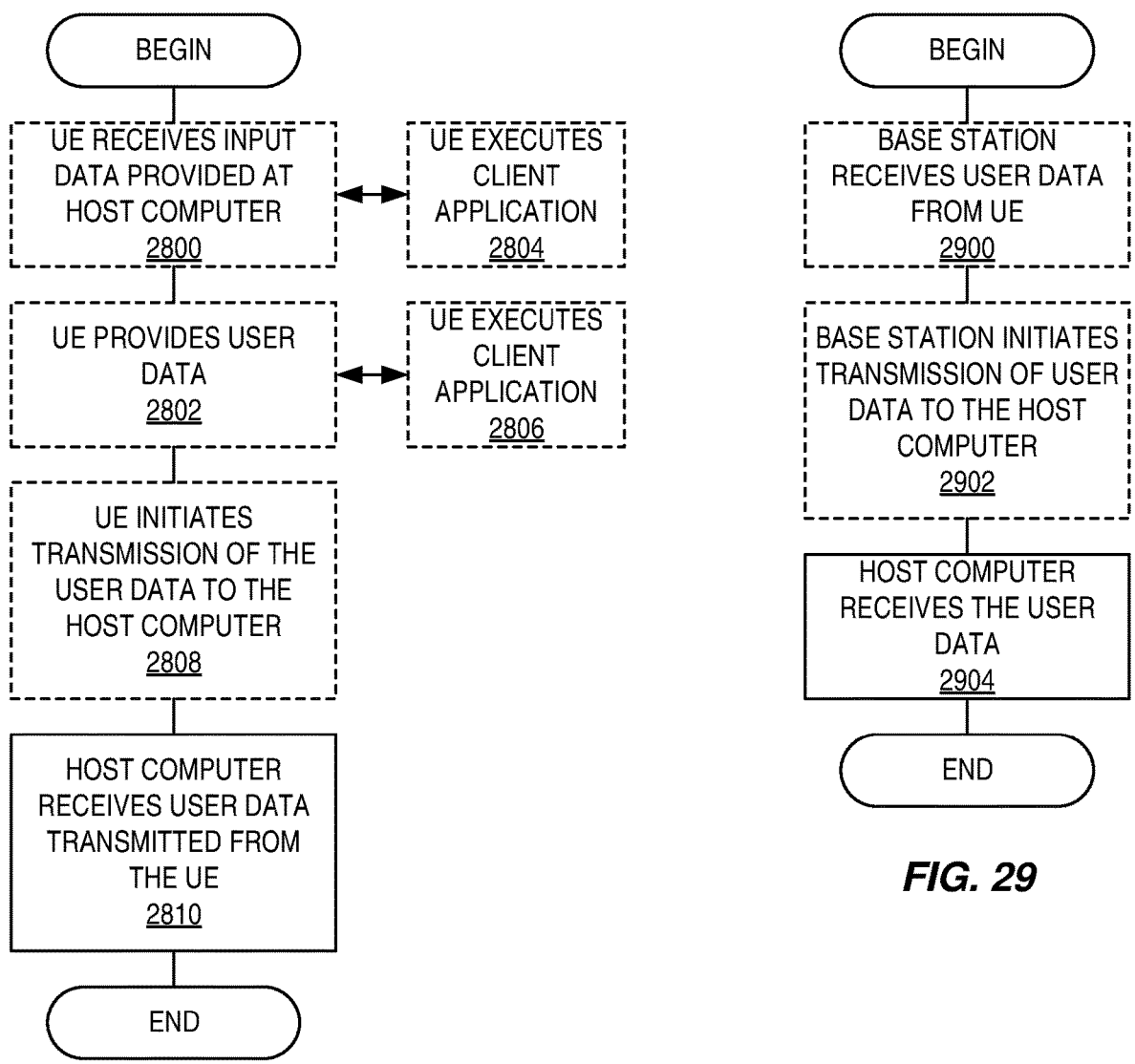
FIG. 28 is a flowchart illustrating a method implemented in a communication system in accordance with one embodiment on the present disclosure.
FIG. 29 is a flowchart illustrating a method implemented in a communication system in accordance with one embodiment of the present disclosure.

FIG. 28 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 28 will be included in this section. In step 2800 (which may be optional), the UE receives input data provided by the host computer. Additionally or alternatively, in step 2802, the UE provides user data. In sub-step 2804 (which may be optional) of step 2800, the UE provides the user data by executing a client application. In sub-step 2806 (which may be optional) of step 2802, the UE executes a client application which provides the user data in reaction to the received input data provided by the host computer. In providing the user data, the executed client application may further consider user input received from the user. Regardless of the specific manner in which the user data was provided, the UE initiates, in sub-step 2808 (which may be optional), transmission of the user data to the host computer. In step 2810 of the method, the host computer receives the user data transmitted from the UE, in accordance with the teachings of the embodiments described throughout this disclosure.

FIG. 29 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 29 will be included in this section. In step 2900 (which may be optional), in accordance with the teachings of the embodiments described throughout this disclosure, the base station receives user data from the UE. In step 2902 (which may be optional), the base station initiates transmission of the received user data to the host computer. In step 2904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a wireless device in a cellular communications network, the method comprising: detecting (1404) a Synchronization Signal Block, SSB; and transmitting (1406) a Physical Random Access Channel, PRACH, preamble on a PRACH occasion mapped to the detected SSB, where a mapping between SSBs and transmit beam directions at a respective base station is defined taking remote interference into consideration.

Embodiment 2: The method of embodiment 1 wherein the mapping between SSBs and transmit beam directions is static.

Embodiment 3: The method of embodiment 1 wherein the mapping between SSBs and transmit beam directions is semi-static.

Embodiment 4: The method of any one of embodiments 1 to 3 wherein the mapping between SSBs and transmit beam directions is such that transmit beam directions that are likely to experience high remote interference are mapped to SSBs with corresponding PRACH occasions that are robust to remote interference (e.g., are positioned in uplink slots/symbols that are later in time than other PRACH occasions that are less robust to remote interference (e.g., are closer to the start of the respective uplink period of the TDD system)).

Embodiment 5: The method of any of the previous embodiments, further comprising: providing user data; and forwarding the user data to a host computer via the transmission to the base station.

Embodiment 6: A method performed by a base station, the method comprising: determining (1400) a Synchronization Signal Block, SSB, to beam direction mapping, taking into consideration remote interference; and using the SSB to beam direction mapping.

Embodiment 7: The method of embodiment 6 wherein using the SSB to beam direction mapping comprises transmitting SSBs on transmit beams in accordance with the determined SSB to beam direction mapping.

Embodiment 8: The method of embodiment 6 or 7 further comprising: detecting and processing (1406, 1408) a Physical Random Access Channel, PRACH, preamble on a PRACH occasion in accordance with the SSB to beam direction mapping.

Embodiment 9: The method of any one of embodiments 6 to 8 wherein the mapping between SSBs and transmit beam directions is static.

Embodiment 10: The method of any one of embodiments 6 to 8 wherein the mapping between SSBs and transmit beam directions is semi-static.

Embodiment 11: The method of any one of embodiments 6 to 10 wherein the mapping between SSBs and transmit beam directions is such that transmit beam directions that are likely to experience high remote interference are mapped to SSBs with corresponding PRACH occasions that are robust to remote interference (e.g., are positioned in uplink slots/symbols that are later in time than other PRACH occasions that are less robust to remote interference (e.g., are closer to the start of the respective uplink period of a Time Division Duplexing, TDD, system).

Embodiment 12: The method of any of the previous embodiments, further comprising: obtaining user data; and forwarding the user data to a host computer or a wireless device.

Embodiment 13: A wireless device, the wireless device comprising: processing circuitry configured to perform any of the steps of any of embodiments 1 to 5; and power supply circuitry configured to supply power to the wireless device.

Embodiment 14: A base station, the base station comprising: processing circuitry configured to perform any of the steps of any of embodiments 6 to 12; and power supply circuitry configured to supply power to the base station.

Embodiment 15: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of embodiments 1 to 5; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 16: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of embodiments 6 to 12.

Embodiment 17: The communication system of the previous embodiment further including the base station.

Embodiment 18: The communication system of the previous 2 embodiments, further including the UE, wherein the UE is configured to communicate with the base station.

Embodiment 19: The communication system of the previous 3 embodiments, wherein: the processing circuitry of the host computer is configured to execute a host application, thereby providing the user data; and the UE comprises processing circuitry configured to execute a client application associated with the host application.

Embodiment 20: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of embodiments 6 to 12.

Embodiment 21: The method of the previous embodiment, further comprising, at the base station, transmitting the user data.

Embodiment 22: The method of the previous 2 embodiments, wherein the user data is provided at the host computer by executing a host application, the method further comprising, at the UE, executing a client application associated with the host application.

Embodiment 23: A User Equipment, UE, configured to communicate with a base station, the UE comprising a radio interface and processing circuitry configured to perform the method of the previous 3 embodiments.

Embodiment 24: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of embodiments 1 to 5.

Embodiment 25: The communication system of the previous embodiment, wherein the cellular network further includes a base station configured to communicate with the UE.

Embodiment 26: The communication system of the previous 2 embodiments, wherein: the processing circuitry of the host computer is configured to execute a host application, thereby providing the user data; and the UE's processing circuitry is configured to execute a client application associated with the host application.

Embodiment 27: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of embodiments 1 to 5.

Embodiment 28: The method of the previous embodiment, further comprising at the UE, receiving the user data from the base station.

Embodiment 29: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of embodiments 1 to 5.

Embodiment 30: The communication system of the previous embodiment, further including the UE.

Embodiment 31: The communication system of the previous 2 embodiments, further including the base station, wherein the base station comprises a radio interface configured to communicate with the UE and a communication interface configured to forward to the host computer the user data carried by a transmission from the UE to the base station.

Embodiment 32: The communication system of the previous 3 embodiments, wherein: the processing circuitry of the host computer is configured to execute a host application; and the UE's processing circuitry is configured to execute a client application associated with the host application, thereby providing the user data.

Embodiment 33: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 34: A method implemented in a communication system including a host computer, a base station, and a User Equipment, UE, the method comprising: at the host computer, receiving user data transmitted to the base station from the UE, wherein the UE performs any of the steps of any of embodiments 1 to 5.

Embodiment 35: The method of the previous embodiment, further comprising, at the UE, providing the user data to the base station.

Embodiment 36: The method of the previous 2 embodiments, further comprising: at the UE, executing a client application, thereby providing the user data to be transmitted; and at the host computer, executing a host application associated with the client application.

Embodiment 37: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 38: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of embodiments 6 to 12.

Embodiment 39: The communication system of the previous embodiment further including the base station.

Embodiment 40: The communication system of the previous 2 embodiments, further including the UE, wherein the UE is configured to communicate with the base station.

Embodiment 41: The communication system of the previous 3 embodiments, wherein: the processing circuitry of the host computer is configured to execute a host application; and the UE is configured to execute a client application associated with the host application, thereby providing the user data to be received by the host computer.

Embodiment 42: A method implemented in a communication system including a host computer, a base station, and a User Equipment, UE, the method comprising: at the host computer, receiving, from the base station, user data originating from a transmission which the base station has received from the UE, wherein the UE performs any of the steps of any of embodiments 1 to 5.

Embodiment 43: The method of the previous embodiment, further comprising at the base station, receiving the user data from the UE.

Embodiment 44: The method of the previous 2 embodiments, further comprising at the base station, initiating a transmission of the received user data to the host computer.

Embodiment 45: A method performed by a wireless device in a cellular communications network, the method comprising: obtaining a Synchronization Signal Block, SSB, scrambling order, the SSB scrambling order defining an order in which SSB indices are mapped to Physical Random Access Channel, PRACH, occasions; and applying (1808) the SSB scrambling order.

Embodiment 46: The method of embodiment 45 wherein obtaining the SSB scrambling order comprises receiving (1802), from a base station, an indication of the SSB scrambling order.

Embodiment 47: The method of embodiment 46 wherein receiving (1802) the indication of the SSB scrambling order comprises receiving, from the base station, a static configuration of the SSB scrambling order.

Embodiment 48: The method of any one of embodiment 46 wherein receiving (1802) the indication of the SSB scrambling order comprises receiving, from the base station, a semi-static configuration of the SSB scrambling order.

Embodiment 49: The method of embodiment 45 wherein obtaining the SSB scrambling order comprises determining the SSB scrambling order based on a predefined rule.

Embodiment 50: The method of embodiment 49 wherein the predefined rule is that the SSB scrambling order is a bit-reversed order in every second SSB burst set.

Embodiment 51: The method of embodiment 51 wherein the predefined rule further states that a not bit reversed order is used in the remaining SSB burst sets.

Embodiment 52: The method of any one of embodiments 45 to 51 wherein applying (1808) the SSB scrambling order comprises applying (1808) the SSB scrambling order to determine a PRACH occasion on which to transmit a PRACH preamble.

Embodiment 53: The method of any one of embodiments 45 to 51 wherein applying (1808) the SSB scrambling order comprises transmitting (1808A) a PRACH preamble in accordance with the SSB scrambling order.

Embodiment 54: The method of any one of embodiments 45 to 51 wherein applying (1808) the SSB scrambling order comprises transmitting (1808A) a PRACH preamble on a PRACH occasion defined by the SSB scrambling order.

Embodiment 55: The method of any one of embodiments 45 to 54 wherein the SSB scrambling order defines the order in which the SSB indices are mapped to the PRACH occasions in accordance with a predefined table or rule.

Embodiment 56: The method of any of the previous embodiments, further comprising: providing user data; and forwarding the user data to a host computer via a transmission to the base station.

Embodiment 57: A method performed by a base station of a cellular communications system, the method comprising: determining (1800) a Synchronization Signal Block, SSB, scrambling order, the SSB scrambling order defining an order in which SSB indices are mapped to Physical Random Access Channel, PRACH, occasions; and applying (1808) the SSB scrambling order.

Embodiment 58: The method of embodiment 57 wherein determining (1800) the SSB scrambling order comprises determining (1800) the SSB scrambling order taking remote interference into consideration.

Embodiment 59: The method of embodiment 58 wherein the SSB scrambling order is such that a SSB index that corresponds to a beam that is likely to experience a highest amount of remote interference is mapped to a PRACH occasion that occurs later than other PRACH occasions in corresponding uplink symbol(s)/slot(s).

Embodiment 60: The method of embodiment 58 wherein the SSB scrambling order is such that SSB indices that correspond to beams that are likely to experience low amounts of remote interference are mapped to respective PRACH occasions at or near a start of corresponding uplink symbols/slots.

Embodiment 61: The method of any one of embodiments 57 to 60 further comprising signaling (1802) an indication of the SSB scrambling order to a wireless device.

Embodiment 62: The method of embodiment 61 wherein signaling (1802) the indication of the SSB scrambling order to the wireless device comprises signaling a static configuration of the SSB scrambling order to the wireless device.

Embodiment 63: The method of embodiment 61 wherein signaling (1802) the indication of the SSB scrambling order to the wireless device comprises signaling a semi-static configuration of the SSB scrambling order to the wireless device.

Embodiment 64: The method of any one of embodiments 57 to 63 wherein applying (1808) the SSB scrambling order comprises applying (1808) the SSB scrambling order when processing PRACH preamble transmissions received from one or more wireless devices to determine a mapping between PRACH occasions in which the PRACH preamble transmissions are detected and respective SSB indices.

Embodiment 65: The method of any of the previous embodiments, further comprising: obtaining user data; and forwarding the user data to a host computer or a wireless device.

Embodiment 66: A wireless device, the wireless device comprising: processing circuitry configured to perform any of the steps of any of embodiments 45 to 56; and power supply circuitry configured to supply power to the wireless device.

Embodiment 67: A base station, the base station comprising: processing circuitry configured to perform any of the steps of any of embodiments 57 to 65; and power supply circuitry configured to supply power to the base station.

Embodiment 68: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of embodiments 45 to 56; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 69: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of embodiments 57 to 65.

Embodiment 70: The communication system of the previous embodiment further including the base station.

Embodiment 71: The communication system of the previous 2 embodiments, further including the UE, wherein the UE is configured to communicate with the base station.

Embodiment 72: The communication system of the previous 3 embodiments, wherein: the processing circuitry of the host computer is configured to execute a host application, thereby providing the user data; and the UE comprises processing circuitry configured to execute a client application associated with the host application.

Embodiment 73: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of embodiments 57 to 65.

Embodiment 74: The method of the previous embodiment, further comprising, at the base station, transmitting the user data.

Embodiment 75: The method of the previous 2 embodiments, wherein the user data is provided at the host computer by executing a host application, the method further comprising, at the UE, executing a client application associated with the host application.

Embodiment 76: A User Equipment, UE, configured to communicate with a base station, the UE comprising a radio interface and processing circuitry configured to perform the method of the previous 3 embodiments.

Embodiment 77: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of embodiments 45 to 56.

Embodiment 78: The communication system of the previous embodiment, wherein the cellular network further includes a base station configured to communicate with the UE.

Embodiment 79: The communication system of the previous 2 embodiments, wherein: the processing circuitry of the host computer is configured to execute a host application, thereby providing the user data; and the UE's processing circuitry is configured to execute a client application associated with the host application.

Embodiment 80: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of embodiments 45 to 56.

Embodiment 81: The method of the previous embodiment, further comprising at the UE, receiving the user data from the base station.

Embodiment 82: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of embodiments 45 to 56.

Embodiment 83: The communication system of the previous embodiment, further including the UE. The communication system of the previous 2 embodiments, further including the base station, wherein the base station comprises a radio interface configured to communicate with the UE and a communication interface configured to forward to the host computer the user data carried by a transmission from the UE to the base station.

Embodiment 84: The communication system of the previous 3 embodiments, wherein: the processing circuitry of the host computer is configured to execute a host application; and the UE's processing circuitry is configured to execute a client application associated with the host application, thereby providing the user data.

Embodiment 85: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 86: A method implemented in a communication system including a host computer, a base station, and a User Equipment, UE, the method comprising: at the host computer, receiving user data transmitted to the base station from the UE, wherein the UE performs any of the steps of any of embodiments 45 to 56.

Embodiment 87: The method of the previous embodiment, further comprising, at the UE, providing the user data to the base station.

Embodiment 88: The method of the previous 2 embodiments, further comprising: at the UE, executing a client application, thereby providing the user data to be transmitted; and at the host computer, executing a host application associated with the client application.

Embodiment 89: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 90: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of embodiments 57 to 65.

Embodiment 91: The communication system of the previous embodiment further including the base station.

Embodiment 92: The communication system of the previous 2 embodiments, further including the UE, wherein the UE is configured to communicate with the base station.

Embodiment 93: The communication system of the previous 3 embodiments, wherein: the processing circuitry of the host computer is configured to execute a host application; and the UE is configured to execute a client application associated with the host application, thereby providing the user data to be received by the host computer.

Embodiment 94: A method implemented in a communication system including a host computer, a base station, and a User Equipment, UE, the method comprising: at the host computer, receiving, from the base station, user data originating from a transmission which the base station has received from the UE, wherein the UE performs any of the steps of any of embodiments 45 to 56.

Embodiment 95: The method of the previous embodiment, further comprising at the base station, receiving the user data from the UE.

Embodiment 96: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
AP Access Point
ASIC Application Specific Integrated Circuit
BS Base Station
BSC Base Station Controller
BTS Base Transceiver Station
CB Contention Based
CPU Central Processing Unit
CRS Cell Specific Reference Signal
CSI-RS Channel State Information Reference Signal
D2D Device-to-Device
DAS Distributed Antenna System
dB Decibel
DCI Downlink Control Information
DL Downlink
DMRS Demodulation Reference Signal
DSP Digital Signal Processor
DwPTS Downlink Pilot Time Slot
eNB Enhanced or Evolved Node B
E-PDCCH Enhanced Physical Downlink Control Channel
E-SMLC Evolved Serving Mobile Location Center
E-UTRA Evolved Universal Terrestrial Radio Access
FDD Frequency Division Duplexing
FPGA Field Programmable Gate Array
gNB Next Generation Node B/New Radio Base Station
GP Guard Period
IE Information Element
LEE Laptop Embedded Equipment
LME Laptop Mounted Equipment
LTE Long Term Evolution
M2M Machine-to-Machine
MBSFN Multimedia Broadcast Multicast Service Single Frequency Network
MeNB Master Enhanced or Evolved Node B
MIB Master Information Block
MME Mobility Management Entity
MPDCCH Massive Physical Downlink Control Channel
ms Millisecond
MSC Mobile Switching Center
MSR Multi-Standard Radio
NB-IoT Narrowband Internet of Things
NPBCH Narrowband Physical Broadcasting Channel
NPDCCH Narrowband Physical Downlink Control Channel
NPDSCH Narrowband Physical Shared Channel
NPRACH Narrowband Physical Random Access Channel
NPSS Narrowband Internet of Things Primary Synchronization Signal
NPUSCH Narrowband Physical Uplink Shared Channel
NR New Radio
NR-PBCH New Radio Physical Broadcast Channel
NRS Narrowband Reference Signal
NSSS Narrowband Internet of Things Secondary Synchronization Signal
O&M Operation and Maintenance
OFDM Orthogonal Frequency Division Multiplexing
OSS Operations Support System
OTT Over-the-Top
PBCH Physical Broadcast Channel
PDA Personal Digital Assistant
PDCCH Physical Downlink Control Channel
PDSCH Physical Downlink Shared Channel
PRACH Physical Random Access Channel
ProSe Proximity Service
PRS Positioning Reference Signal
PSS Primary Synchronization Signal
PUCCH Physical Uplink Control Channel
PUSCH Physical Uplink Shared Channel
QCL Quasi Co-Location
RA Random Access
RACH Random Access Channel
RAM Random Access Memory
RAN Radio Access Network
RAR Random Access Response
RAT Radio Access Technology
Rel-15 Release 15
Rel-16 Release 16
RI Remote Interference
RIM Remote Interference Management
RNC Radio Network Controller RO RACH Occasion
ROM Read Only Memory
RRC Radio Resource Control
RRH Remote Radio Head
RRU Remote Radio Unit
RS Reference Signal
RSU Road Side Unit
Rx Receive
SeNB Secondary Enhanced or Evolved Node B
SFI Slot Format Indicator
SIB System Information Block
SON Self-Organizing Network
sPDSCH Short Transmit Time Interval Physical Downlink Shared Channel
sPUCCH Short Transmit Time Interval Physical Uplink Control Channel
sPUSCH Short Transmit Time Interval Physical Uplink Shared Channel
SRS Sounding Reference Signal
SS Synchronization Signal
SSB Synchronization Signal Block
SSS Secondary Synchronization Signal
sTTI Short Transmit Time Interval
TCI Transmission Configuration Indication
TDD Time Division Duplexing
TRP Transmission and Reception Point
TS Technical Specification
TTI Transmission Time Interval
Tx Transmit
UE User Equipment
UL Uplink
UpPTS Uplink Pilot Time Slot
USB Universal Serial Bus
UTRA Universal Terrestrial Radio Access
V2X Vehicle-to-Everything
ZoA Zenith Angle of Arrival
ZoD Zenith Angle of Departure Those skilled in the art will recognize improvements and modifications to the embodiments of the present disclosure. All such improvements and modifications are considered within the scope of the concepts disclosed herein.

What is claimed is:

1. A method performed by a base station in a cellular communications network, the method comprising:
   measuring remote interference on a plurality of beam directions;
   determining a mapping between the plurality of beam directions and Synchronization Signal Block, SSB, index, resulting in a beam direction to SSB index mapping, taking into consideration remote interference, wherein determining the mapping between the SSBs and the plurality of beam directions comprises performing the mapping between the SSBs and the plurality of beam directions such that one or more of the SSBs that correspond to Physical Random Access Channel, PRACH, occasions that are resistant to remote interference are mapped to one or more beam directions having a predefined level of remote interference, respectively; and
   using the beam direction to SSB index mapping.

2. The method of claim 1, wherein the cellular communications network is a Time Division Duplexing, TDD, network, and the PRACH occasions that are resistant to remote interference are PRACH occasions that are furthest away from a start of a respective uplink period of the TDD network.

3. The method of claim 1, wherein using the beam direction to SSB index mapping comprises transmitting SSBs on transmit beams in accordance with the determined beam direction to SSB index mapping.

4. The method of claim 1, further comprising:
   detecting and processing a PRACH preamble on a PRACH occasion in accordance with the beam direction to SSB index mapping.

5. The method of claim 1, wherein the beam direction to SSB index mapping is static.

6. The method of claim 1, wherein the beam direction to SSB index mapping is semi-static.

7. The method of claim 1, wherein the beam direction to SSB index mapping is such that transmit beam directions that experience remote interference are mapped to SSBs with corresponding PRACH occasions that are resistant to remote interference.

8. The method of claim 1, wherein the cellular communications network is a TDD network, and the beam direction to SSB index mapping is such that transmit beam directions that experience remote interference are mapped to SSBs with corresponding PRACH occasions that are furthest away from a start of a respective uplink period of the TDD network.

9. The method of claim 1, wherein the beam direction to SSB index mapping comprises:
   a first mapping between SSBs and PRACH occasions is predefined; and
   a second mapping between the SSBs and transmit beam directions at the respective base station is defined taking remote interference into consideration.

10. A base station for a cellular communications network comprising processing circuitry configured to cause the base station to:
    measure remote interference on a plurality of beam directions;
    determine a mapping between the plurality of beam directions and Synchronization Signal Block, SSB, index, resulting in a beam direction SSB index mapping, taking into consideration remote interference, wherein determining the mapping between the SSBs and the plurality of beam directions comprises performing the mapping between the SSBs and the plurality of beam directions such that one or more of the SSBs that correspond to Physical Random Access Channel, PRACH, occasions that are resistant to remote interference are mapped to one or more beam directions having a predefined level of remote interference, respectively; and
    use the beam direction to SSB index mapping.

11. A method performed by a wireless device in a cellular communications network, the method comprising:
    detecting a Synchronization Signal Block, SSB; and
    transmitting a Physical Random Access Channel, PRACH, preamble on a PRACH occasion mapped to the detected SSB, where a mapping between an SSB index and transmit beam directions performed by a respective base station is defined taking remote interference into consideration such that one or more SSBs of the SSB index that correspond to PRACH occasions that are resistant to remote interference are mapped to one or more beam directions having a predefined level of remote interference, respectively, wherein the mapping results in a beam direction to SSB index mapping.

12. The method of claim 11, wherein the mapping between the SSBs and the transmit beam directions is static.

13. The method of claim 11, wherein the mapping between the SSBs and the transmit beam directions is semi-static.

14. The method of claim 11, wherein the mapping between the SSBs and the transmit beam directions is such that transmit beam directions that experience remote interference are mapped to SSBs with corresponding PRACH occasions that are resistant to remote interference.

15. The method of claim 11, wherein the cellular communications network is a Time Division Duplexing, TDD, network, and the mapping between the SSBs and the transmit beam directions is such that transmit beam directions that experience remote interference are mapped to SSBs with corresponding PRACH monitoring occasions that are furthest away from a start of a respective uplink period of the TDD network.

16. The method of claim 11, wherein the mapping between the SSBs and the transmit beam directions at the respective base station comprises:

a first mapping between SSBs and PRACH occasions is predefined; and a second mapping between the SSBs and the transmit beam directions at the respective base station is defined taking remote interference into consideration.

17. A wireless device comprising:
one or more transmitters;
one or more receivers; and
processing circuitry associated with the one or more transmitters and the one or more receivers, the processing circuitry configured to cause the wireless device to:
detect a Synchronization Signal Block, SSB; and
transmit a Physical Random Access Channel, PRACH, preamble on a PRACH occasion mapped to the detected SSB, where a mapping between an SSB index and transmit beam directions performed by a respective base station is defined taking remote interference into consideration such that one or more SSBs of the SSB index that correspond to PRACH occasions that are resistant to remote interference are mapped to one or more beam directions having a predefined level of remote interference, respectively, wherein the mapping results in a beam direction to SSB index mapping.

\* \* \* \* \*